US012639731B2

(12) United States Patent (10) Patent No.: US 12,639,731 B2
Nath (45) Date of Patent: May 26, 2026

(54) TRAINING AND DEPLOYMENT FRAMEWORK FOR MACHINE LEARNING BASED RECOMMENDATION SYSTEM

(71) Applicant: Oracle Financial Services Software Limited, Goregaon (IN)

(72) Inventor: Mridul Kumar Nath, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 57 days.

(21) Appl. No.: 18/680,041

(22) Filed: May 31, 2024

(65) Prior Publication Data

US 2025/0371585 A1    Dec. 4, 2025

(51) Int. Cl.
*G06Q 30/0282* (2023.01)
*G06N 20/00* (2019.01)

(52) U.S. Cl.
CPC ......... *G06Q 30/0282* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,407,105 B2 | 3/2013 | Linden et al. | |
| 9,275,116 B2 | 3/2016 | Sekino | |
| 10,650,804 B2 | 5/2020 | Dolan et al. | |
| 11,176,589 B2 * | 11/2021 | Pyati ..................... | G06N 20/00 |
| 11,204,958 B2 | 12/2021 | Ye et al. | |
| 2018/0047071 A1 * | 2/2018 | Hsu ..................... | G06Q 30/0282 |
| 2021/0342917 A1 * | 11/2021 | Parker ................ | G06Q 30/0631 |
| 2022/0138605 A1 * | 5/2022 | Liao ........................ | G06N 5/043 |
| | | | 706/11 |
| 2022/0414719 A1 * | 12/2022 | Kulkarni ................. | H04L 51/02 |

(Continued)

OTHER PUBLICATIONS

"A Guide to Content-Based Filtering in Recommender Systems", Available online at: https://www.turing.com/kb/content-based-filtering-in-recommender-systems, Accessed from internet on Jun. 28, 2024, pp. 1-9.

(Continued)

*Primary Examiner* — David P Sharvin
(74) *Attorney, Agent, or Firm* — Kilpatrick Townsend & Stockton LLP

(57) ABSTRACT

Disclosed herein is a training and deployment framework for a machine learning based recommendation system. In one aspect, a computer-implement method is provided for synthesizing training and testing data and using the training and testing data to generate a machine learning model. The computer-implement method includes deriving product ratings for products, the product ratings being stored in a user product score table in association with identifiers for users and the products, sampling the user product score table to generate a training and testing data set, training, using the training data set, machine learning models for a task of predicting product ratings, evaluating, using the testing data set, performance of the machine learning models, selecting one of the machine learning models for production use in predicting product ratings based on the evaluating, and predicting, using the selected machine learning model, new product ratings for the products.

17 Claims, 27 Drawing Sheets

(56) References Cited

U.S. PATENT DOCUMENTS

| | | | |
|---|---|---|---|
| 2024/0289835 A1* | 8/2024 | Prakash ............. | G06Q 30/0207 |
| 2025/0225561 A1* | 7/2025 | Raghavan .......... | G06Q 30/0641 |

OTHER PUBLICATIONS

Chen , "Recommender System—Matrix Factorization", Available online at: https://towardsdatascience.com/recommendation-system-matrix-factorization-d61978660b4b, Jul. 8, 2020, pp. 1-17.
Qutbuddin , "Comprehensive Guide on Item Based Collaborative Filtering", Available online at: https://medium.com/p/d67e40e2b75d, Mar. 7, 2020, pp. 1-35.

* cited by examiner

INTEREST RATES ON DOMESTIC DEPOSITS*

DEPOSITS - LESS THAN ₹ 5 CRORES*

| Maturity Period | Interest Rates (per cent per annum) | | | | |
| | General | | Senior Citizens | | |
| | Less than ₹ 2 Cr | ₹ 2 Cr to Less than ₹ 5 Cr | Less than ₹ 2 Cr | ₹ 2 Cr to Less than ₹ 5 Cr | |
| 7 - 14 days | 3.00 | 4.80 | 3.50 | 5.30 | |
| 15 - 29 days | 3.00 | 5.00 | 3.50 | 5.50 | |
| 30 - 45 days | 3.50 | 5.50 | 4.00 | 6.00 | |
| 46 - 60 days | 4.25 | 5.75 | 4.75 | 6.25 | |

FIG. 1

| # | Column Name | Data Type |
|---|---|---|
| 1 | CUST_ID | VARCHAR2 |
| 2 | PROD_CODE | VARCHAR2 |
| 3 | POSITIVE_ATTRIBUTE_1 | NUMBER |
| 4 | POSITIVE_ATTRIBUTE_2 | NUMBER |
| 5 | POSITIVE_ATTRIBUTE_3 | NUMBER |
| 6 | POSITIVE_ATTRIBUTE_4 | NUMBER |
| 7 | ... | NUMBER |
| 8 | POSITIVE_ATTRIBUTE_N | NUMBER |
| 9 | NEGATIVE_ATTRIBUTE_1 | NUMBER |
| 10 | NEGATIVE_ATTRIBUTE_2 | NUMBER |
| 11 | ... | NUMBER |
| 12 | NEGATIVE_ATTRIBUTE_N | NUMBER |

FIG. 3A

Example 1:

For a loan product type, positive attributes could be

- Number of on-time schedule payments
- Number of loans under the product for a customer
- Interest rate decrement (positive event from customer viewpoint)

While the following can be considered as negative attributes,

- Number of delayed payments
- Penalty interest amount charged
- Interest rate increment (negative event from customer viewpoint)

FIG. 3B

| Customer ID | Product Code | Ontime Payments | Number of Loans | Interest Rate Decrement | Delayed Payments | Penalty Interest Amount | Interest Rate Increment |
|---|---|---|---|---|---|---|---|
| 1 | PersonalLoan1 | 17 | 2 | 0 | 3 | 176 | 0.15 |
| 2 | HomeLoan1 | 48 | 1 | 0.73 | 0 | 0 | 0 |
| 3 | EducationLoan1 | 7 | 1 | 0 | 0 | 0 | 0 |
| 4 | PersonalLoan1 | 25 | 3 | 0.08 | 12 | 218 | 1.26 |
| 5 | EducationLoan2 | 8 | 1 | 0 | 0 | 0 | 0.05 |

FIG. 3C

| # | Column Name | Data Type |
|---|---|---|
| 1 | ATTRIBUTE | VARCHAR2 |
| 2 | EVENT_WEIGHTAGE | NUMBER |

FIG. 3D

Example 2:
For a loan product type, the representative attribute weightage could be,

| Lifecycle_Event | Event_Weightage |
|---|---|
| OntimePayments | 1 |
| NumberOfLoans | 0.8 |
| InterestRateDecrement | 0.9 |
| DelayedPayments | -1 |
| PenaltyInterestAmount | -0.9 |
| InterestRateIncrement | -0.8 |

FIG. 3E

| # | Column Name | Data Type |
|---|---|---|
| 1 | PRODUCT_CODE | VARCHAR2 |
| 2 | PROD_TYPE | NUMBER |
| 3 | FEATURE_2 | NUMBER |
| ... |  | NUMBER |
| n | FEATURE_N | NUMBER |

FIG. 3F

Example 3:

For a loan/deposit product, the representative features could be,

| PRODUCT CODE | PROD TYPE | INT RATE | MIN TENURE | MAX TENURE | MIN AMT | MAX AMT | TOTAL TXN | OPEN TXN | DFLT TXN |
|---|---|---|---|---|---|---|---|---|---|
| L1 | 1 | 11.25 | 60 | 300 | 1000000 | 5000000 | 1750 | 1642 | 23 |
| L2 | 2 | 17.75 | 12 | 36 | 25000 | 500000 | 532 | 374 | 27 |
| L3 | 3 | 9.15 | 36 | 84 | 500000 | 1000000 | 168 | 1543 | 7 |

FIG. 3G

| # | Column Name | Data Type |
|---|---|---|
| 1 | CUSTOMER_ID | VARCHAR2 |
| 2 | CUST_TYPE | NUMBER |
| 3 | FEATURE_2 | NUMBER |
| ... | ... | NUMBER |
| n | FEATURE_N | NUMBER |

FIG. 3H

Example 4:
For a customer id, the features could be,

| CUSTOMER_ID | CUST_TYPE | AGE_GRP | GENDER | INC_SLABS | MARITAL_STAT | NUM_ACC | NUM_DEP | NUM_LON | AVG_ACCBAL |
|---|---|---|---|---|---|---|---|---|---|
| 1 | 1 | MI | 1 | A1 | U | 2 | 1 | 2 | 2500 |
| 2 | 2 | SS | 2 | A2 | M | 3 | 2 | 1 | 7900 |
| 3 | 2 | GZ | 2 | C1 | M | 1 | 0 | 1 | 1745 |
| 4 | 3 | SS | 3 | B2 | D | 4 | 3 | 1 | 2984 |
| 5 | 1 | GZ | 1 | A2 | U | 2 | 0 | 0 | 3455 |

FIG. 3I

| Customer ID | Product Code | Ontime Payments | Number of Loans | Interest Rate Decrement | Delayed Payments | Penalty Interest Amount | Interest Rate Increment |
|---|---|---|---|---|---|---|---|
| 1 | PersonalLoan1 | 17 | 2 | 0 | 3 | 176 | 0.15 |
| 2 | HomeLoan1 | 48 | 1 | 0.73 | 0 | 0 | 0 |
| 3 | EducationLoan1 | 7 | 1 | 0 | 0 | 0 | 0 |
| 4 | PersonalLoan1 | 25 | 3 | 0.08 | 12 | 218 | 1.26 |
| 5 | EducationLoan2 | 8 | 1 | 0 | 0 | 0 | 0.05 |

FIG. 3J $$[A]_{m \times n} = \begin{bmatrix} i_{11} & i_{12} & i_{13} & . & . & i_{1n} \\ i_{21} & i_{22} & i_{23} & . & . & i_{2n} \\ i_{31} & i_{32} & i_{33} & . & . & i_{3n} \\ . & . & . & & & . \\ i_{m1} & i_{m2} & i_{m3} & . & . & i_{mn} \end{bmatrix} \quad \cdots\cdots(1)$$

FIG. 3K

Example 5: Considering the above customer product data, matrix [A] would be represented as below, after normalization $$[A]_{m*n} = \begin{bmatrix} [0.243902, 0.5 & , 0. & , 0.25 & , 0.807339, 0.119048], \\ [1. & , 0. & , 1. & , 0. & , 0. & , 0. & ], \\ [0. & , 0. & , 0. & , 0. & , 0. & , 1. & ], \\ [0.439024, 1. & , 0.109589, 1. & , 1. & , 0. & ], \\ [0.02439 & , 0. & , 0. & , 0. & , 1. & , 0.039683]] \end{bmatrix}$$

| Lifecycle_Event | Event_Weightage |
|---|---|
| OntimePayments | 1 |
| NumberOfLoans | 0.8 |
| InterestRateDecrement | 0.9 |
| DelayedPayments | -1 |
| PenaltyInterestAmount | -0.9 |
| InterestRateIncrement | -0.8 |

$$[B]_{a*b} = . \begin{bmatrix} i_{11} \\ i_{21} \\ i_{31} \\ . \\ i_{m1} \end{bmatrix} \quad \text{...................(2)}$$

FIG. 3N

Example 6: Considering the above attribute-weightage data, matrix [B] would be represented as below $$[B]_{a*b} = \begin{bmatrix} 1 \\ 0.8 \\ 0.9 \\ -1 \\ -0.9 \\ -0.8 \end{bmatrix}$$

FIG. 3O $$[C]_{m*n} = \begin{bmatrix} q_{11} & q_{12} & q_{13} & \cdot & q_{1n} \\ q_{21} & q_{22} & q_{23} & \cdot & q_{2n} \\ q_{31} & q_{32} & q_{33} & \cdot & q_{3n} \\ \cdot & \cdot & \cdot & \cdot & \cdot \\ q_{m1} & q_{m2} & q_{m3} & \cdot & q_{mn} \end{bmatrix} \quad \ldots\ldots\ldots\ldots(3)$$

Example 7: Considering the above consumer product data, matrix [A], after encoding in quantiles would be represented as below

$$[D]_{x*y} = \begin{bmatrix} q_{11} & q_{12} & q_{13} & \cdot & \cdot & q_{1n} \\ q_{21} & q_{22} & q_{23} & \cdot & \cdot & q_{2n} \\ q_{31} & q_{32} & q_{33} & \cdot & \cdot & q_{3n} \\ \cdot & & & & & \cdot \\ q_{m1} & q_{m2} & q_{m3} & & \cdot & q_{mn} \end{bmatrix} \times \begin{bmatrix} i_{11} \\ i_{21} \\ i_{31} \\ \cdot \\ i_{m1} \end{bmatrix}$$

FIG. 3S

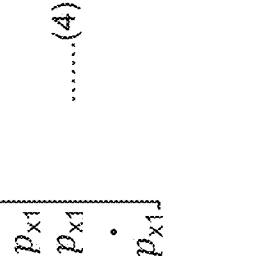

$$\begin{bmatrix} p_{x1} \\ p_{x1} \\ p_{x1} \\ \cdot \\ p_{x1} \end{bmatrix} \quad \cdots\cdots(4)$$

FIG. 3T

Example 8: Considering matrix $[C]_{m*n}$ referenced in (3) and $[B]_{a*b}$ referenced in (2) and performing a matrix multiplication, yields the provisional rating column matrix is shown below $$
\begin{bmatrix}
3., & 5., & 1., & 3., & 9., & 2. \\
10., & 1., & 10., & 1., & 1., & 1. \\
1., & 1., & 1., & 1., & 1., & 1. \\
5., & 10., & 2., & 10., & 10., & 1. \\
1., & 1., & 1., & 1., & 1., & 1.
\end{bmatrix}
\times
\begin{bmatrix}
1 \\
0.8 \\
0.9 \\
-1 \\
-0.9 \\
-0.8
\end{bmatrix}
=
\begin{bmatrix}
-4.80000000e+00 \\
1.71000000e+01 \\
1.11022302e-16 \\
-1.22000000e+01 \\
1.11022300e-16
\end{bmatrix}
$$

FIG. 3U

$$[S]_{m^*n} = \cdot \begin{bmatrix} s_{x1} \\ s_{x1} \\ s_{x1} \\ \cdot \\ s_{x1} \end{bmatrix} \quad \dots\dots(5)$$

FIG. 3V

Example 9: Considering the provisional rating matrix $[D]_{x^*y}$ referenced in (4) yields the final rating column matrix on a scale of 5 is shown below

| | CUSTOMERID | PRODUCTCODE | ... | INTERESTRATEINCREMENT | DERIVED_PROD_RATING |
|---|---|---|---|---|---|
| 0 | 1 | PersonalLoan1 | ... | 0.15 | 2 |
| 1 | 2 | HomeLoan1 | ... | 0.00 | 5 |
| 2 | 3 | EducationLoan1 | ... | 0.00 | 3 |
| 3 | 4 | PersonalLoan1 | ... | 1.26 | 1 |
| 4 | 5 | EducationLoan2 | ... | 0.05 | 3 |

[5 rows x 9 columns ]

Took 0 secs. Last updated by FSGBUML at February 15 2024, 9:38:52 AM.

FIG. 3W

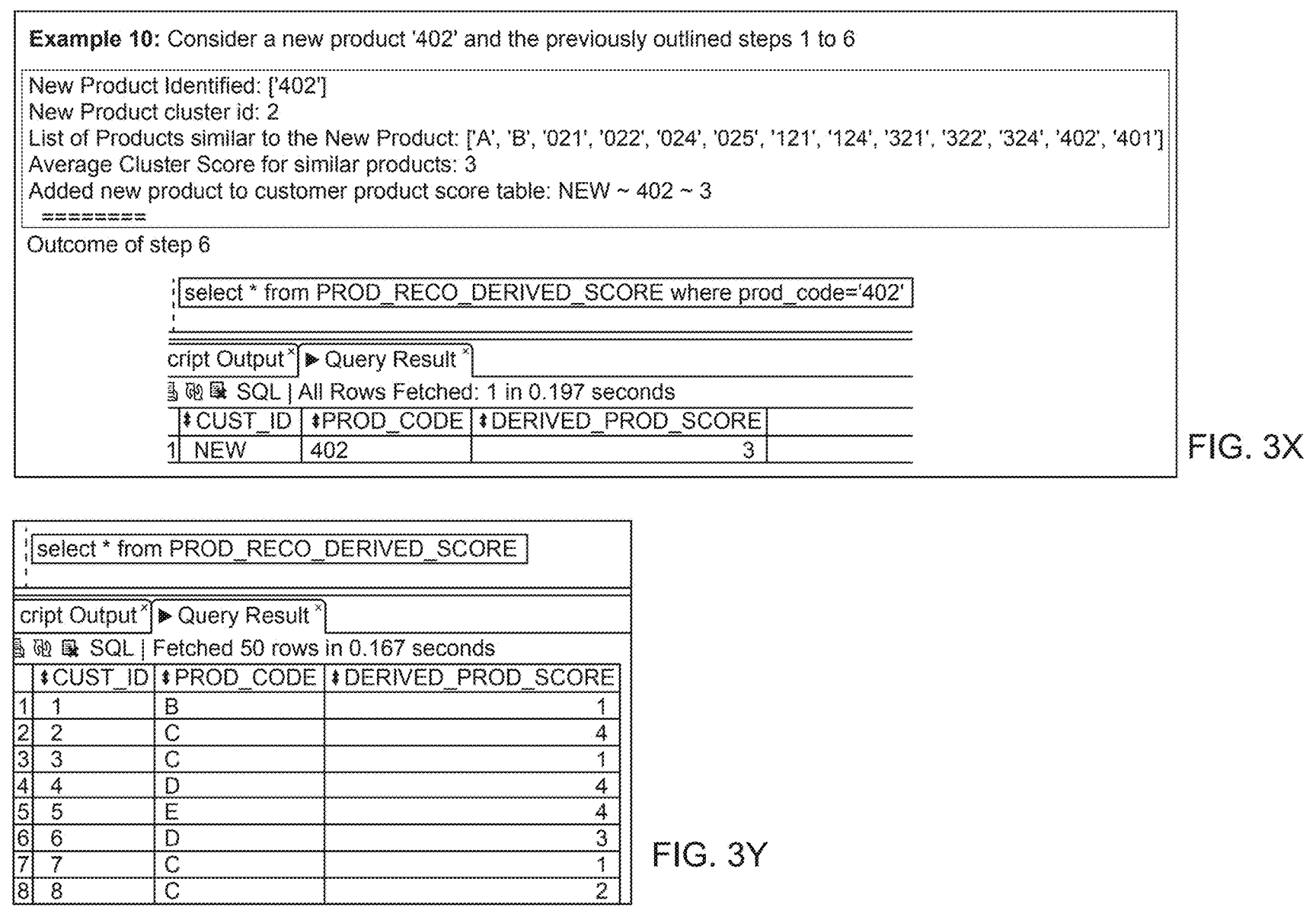

Example 10: Consider a new product '402' and the previously outlined steps 1 to 6

New Product Identified: ['402']
New Product cluster id: 2
List of Products similar to the New Product: ['A', 'B', '021', '022', '024', '025', '121', '124', '321', '322', '324', '402', '401']
Average Cluster Score for similar products: 3
Added new product to customer product score table: NEW ~ 402 ~ 3

========

Outcome of step 6 select * from PROD_RECO_DERIVED_SCORE where prod_code='402' cript Output×  ▲ Query Result×

SQL | All Rows Fetched: 1 in 0.197 seconds

| CUST_ID | PROD_CODE | DERIVED_PROD_SCORE |
|---------|-----------|--------------------|
| 1 NEW   | 402       | 3                  |

FIG. 3X select * from PROD_RECO_DERIVED_SCORE cript Output×  ▲ Query Result×

SQL | Fetched 50 rows in 0.167 seconds

| CUST_ID | PROD_CODE | DERIVED_PROD_SCORE |
|---------|-----------|--------------------|
| 1 1     | B         | 1                  |
| 2 2     | C         | 4                  |
| 3 3     | C         | 1                  |
| 4 4     | D         | 4                  |
| 5 5     | E         | 4                  |
| 6 6     | D         | 3                  |
| 7 7     | C         | 1                  |
| 8 8     | C         | 2                  |

FIG. 3Y

Example 11: Interim Recommendation

| # | CUST_ID | REC_PROD |
|---|---------|----------|
| 1 | 1 | B,C,E |
| 2 | 10 | E,C,0116 |
| 3 | 11 | C,E,0116 |
| 4 | 110 | 0114,0105,0106 |
| 5 | 111 | 0115,C,E |
| 6 | 112 | 0116,C,E |
| 7 | 12 | B,C,E |
| 8 | 127 | 0106,0105,0107 |
| 9 | 13 | B,C,E |

FIG. 3Z

Example 12: Final Recommendation, considering bank products and customer clusters between 1 and 10

| # CUST_ID | # REC_PROD | # CUST_SEG |
|-----------|------------|------------|
| 1 | B,C,E | 3 |
| 10 | E,C,0116 | 2 |
| 11 | C,E,0116 | 1 |
| 110 | 0114,0105,0106 | 4 |
| 111 | 0115,C,E | 2 |
| 112 | 0116,C,E | 2 |
| 12 | B,C,E | 5 |
| 127 | 0106,0105,0107 | 3 |

FIG. 3AA cust_seg: 4

| | CUSTOMER_NO | PROD_RECO |
|---|---|---|
| 579 | 011157543 | 022,024,021,322 |
| 580 | 011132301 | 022,025,0104,023 |
| 581 | 011146267 | 021,0104,023,025 |
| 0 | 022 | |
| 1 | 024 | |
| 2 | 021 | |
| 3 | 322 | |
| 4 | 022 | |
| 5 | 025 | |
| 6 | 0104 | |
| 7 | 023 | |
| 8 | 021 | |
| 9 | 0104 | |
| 10 | 023 | |
| 11 | 025 | |

| | PROD | FREQ |
|---|---|---|
| 0 | 022 | 2 |
| 2 | 021 | 2 |
| 4 | 025 | 2 |
| 5 | 0104 | 2 |
| 6 | 023 | 2 |
| 1 | 024 | 1 |
| 3 | 322 | 1 |

022,021,025
New Cust: 011157543 recommended products: 022,021,025

700

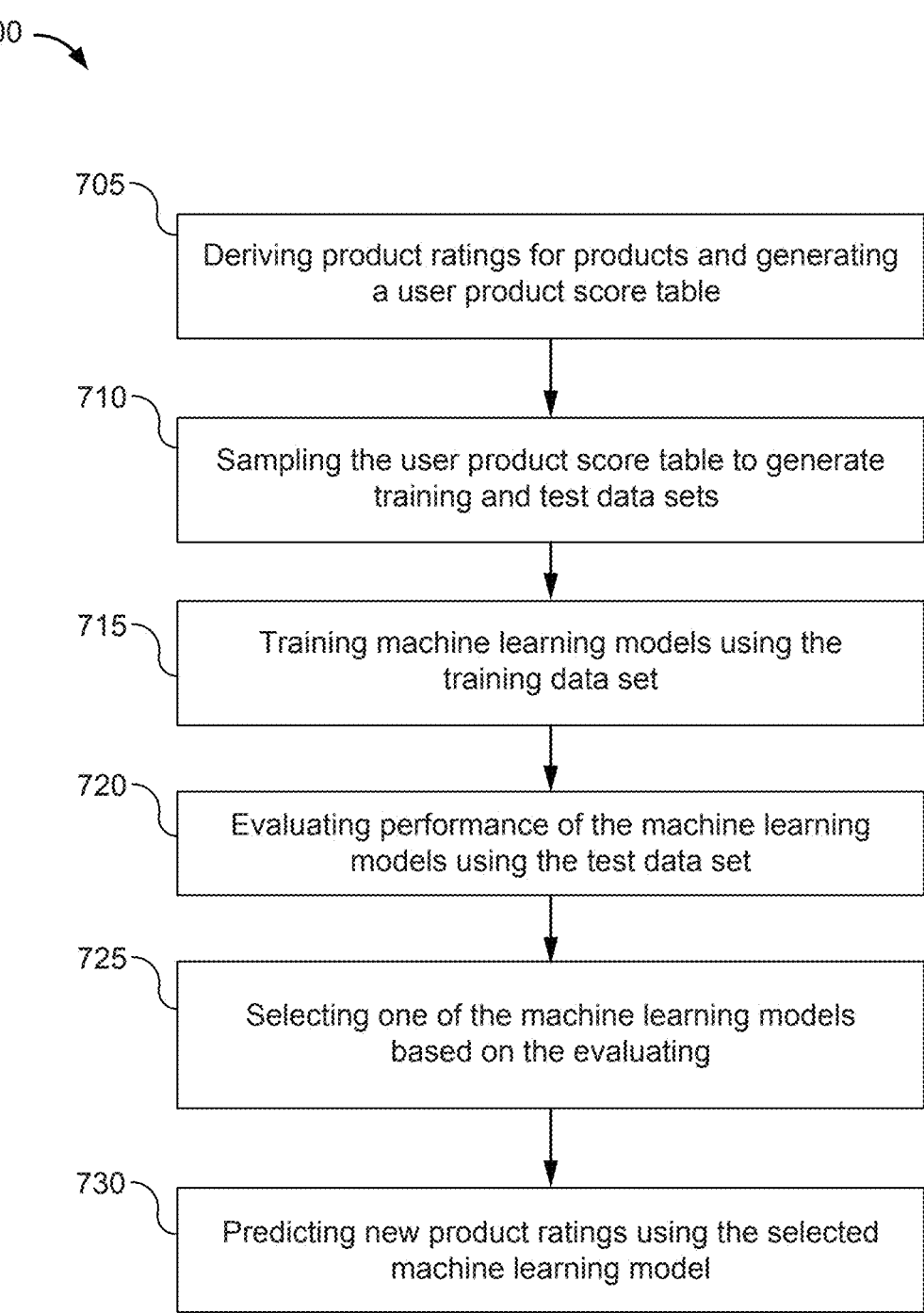

705 — Deriving product ratings for products and generating a user product score table 710 — Sampling the user product score table to generate training and test data sets 715 — Training machine learning models using the training data set 720 — Evaluating performance of the machine learning models using the test data set 725 — Selecting one of the machine learning models based on the evaluating 730 — Predicting new product ratings using the selected machine learning model

FIG. 7

TRAINING AND DEPLOYMENT FRAMEWORK FOR MACHINE LEARNING BASED RECOMMENDATION SYSTEM

FIELD

The present disclosure relates generally to recommendation systems, and more particularly, to a training and deployment framework for machine learning based recommendation system.

BACKGROUND

A recommendation system is a type of information filtering system that aims to predict the preferences or ratings that a user would give to an item. These systems are useful in today's digital landscape, where users are regularly bombarded with an overwhelming amount of choices. The main goal of a recommendation system is to deliver personalized content to users, thus improving their overall experience and satisfaction. These systems leverage various algorithms and data-driven techniques to analyze user behavior, preferences, and interactions with different items.

There are several types of recommendation systems, including collaborative filtering, content-based filtering, and hybrid methods. Collaborative filtering relies on the behavior and preferences of similar users to make recommendations. For example, if User A and User B have similar tastes in movies, a film that User A enjoyed might be recommended to User B. Content-based filtering, on the other hand, focuses on the characteristics of items and recommends items similar to those the user has liked in the past. Hybrid methods combine both approaches to enhance the accuracy and robustness of recommendations. By utilizing these techniques, recommendation systems can predict what users might like, thereby narrowing down the vast array of options to a more manageable and relevant subset.

The applications of recommendation systems are extensive and varied. They are commonly used in e-commerce platforms to suggest products, in streaming services to recommend movies or music, and in social media to suggest content or connections. For instance, Amazon uses recommendation systems to suggest products based on a user's browsing and purchase history, Netflix recommends shows and movies based on viewing patterns, and Spotify curates personalized playlists. These systems not only help users discover new items that align with their interests but also enhance user engagement and retention, as users are more likely to return to a platform that consistently provides relevant and enjoyable content. In essence, recommendation systems play an important role in navigating the ever-growing digital landscape by helping users find what they are looking for amidst an ocean of options.

SUMMARY

Techniques disclosed herein introduce a training and deployment framework for a machine learning based recommendation system.

In various embodiments, a computer-implemented method is provided that comprises: deriving product ratings for products using data from a product-user transactional relationship data model and an attribute-weightage data model, wherein: the products facilitate allocation and storage of resources, the product-user transactional relationship data model stores identifiers for users in association with both positive and negative attributes from product user relationship interactions with the products, and the product ratings are stored in a user product score table in association with identifiers for users and the products; sampling the user product score table to generate subsets of data comprising examples, wherein the subsets of data include a training data set and testing data set, and each of the examples comprises a product rating in association with an identifier for a user and a product; training, using the training data set, machine learning models for a task of predicting product ratings, wherein the training comprises predicting, by each of the machine learning models, product ratings for each user and a product; evaluating, using the testing data set, performance of the machine learning models, wherein the evaluating comprises comparing the predictions for the product ratings against the derived product ratings for the products in the testing data set to calculate error in the predictions; selecting one of the machine learning models for production use in predicting product ratings based on the evaluating; predicting, using the selected machine learning model, new product ratings for the products in the product-user transactional relationship data model; and storing the new product ratings in association with the identifiers for the users within a persistent database object that represents an interim recommendation.

In some embodiments, the computer-implemented method further comprises: accessing product features for the products within a product feature data model; clustering the products into cluster types based on the product features to generate a first cluster model; calculating average product ratings for the products in each cluster type or cluster; determining a cluster type or cluster for a new product based on features of the new product and the first cluster model; assigning a product rating to the new product based on the average product rating calculated for the products in the cluster type or cluster; and updating, prior to the sampling, the user product score table to include the new product and assigned product rating.

In some embodiments, the computer-implemented method further comprises accessing user features for the users within a user feature data model; clustering the users into user types based on the user features to generate a second cluster model; and updating the persistent database object that represents the interim recommendation to include the user types and generate a persistent database object that represents a final recommendation.

In some embodiments, the computer-implemented method further comprises: executing, for a user with an associated user identifier, a query on the persistent database object that represents the final recommendation; retrieving products to be recommended to the user associated with the user identifier based on the query; and communicating to the user at least a subset of the products to be recommended to the user.

In some embodiments, the computer-implemented method further comprises: determining a cluster type or cluster for a new user based on features of the new user and the second cluster model; collating all recommended products of all users falling into the same cluster type or cluster as the new user; ranking all the collated recommend products per frequency; retrieving products to be recommended to the new user based on the ranking; and communicating to the new user at least a subset of the products to be recommended to the new user.

In some embodiments, the training the machine learning models further comprises: performing iterative operations to adjust a set of model parameters of each of the machine learning models to minimize a loss or error function of each of the machine learning models, wherein the loss or error function is configured to calculate the error in the predictions.

In some embodiments, at least one the machine learning models uses an Item-Based Collaborative Filtering (IBCF) algorithm and at least one of the machine learning models uses a Matrix Factorization (MF) algorithm.

In various embodiments, a computer system is provided that includes one or more processors and one or more computer-readable media storing instructions that, when executed by the one or more processors, cause the one or more processors to perform part or all of the operations and/or methods disclosed herein.

In various embodiments, one or more non-transitory computer-readable media are provided that store instructions that, when executed by one or more processors of a computer system, cause the one or more processors to perform part or all of the operations and/or methods disclosed herein.

The techniques described herein may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 1 illustrates sparsity and limited variance in data associated with the allocation and storage of resources according to various embodiments.

FIG. 7 shows an exemplary workflow for training and deployment of a machine learning based recommendation system according to various embodiments.

DETAILED DESCRIPTION

Figure 2:
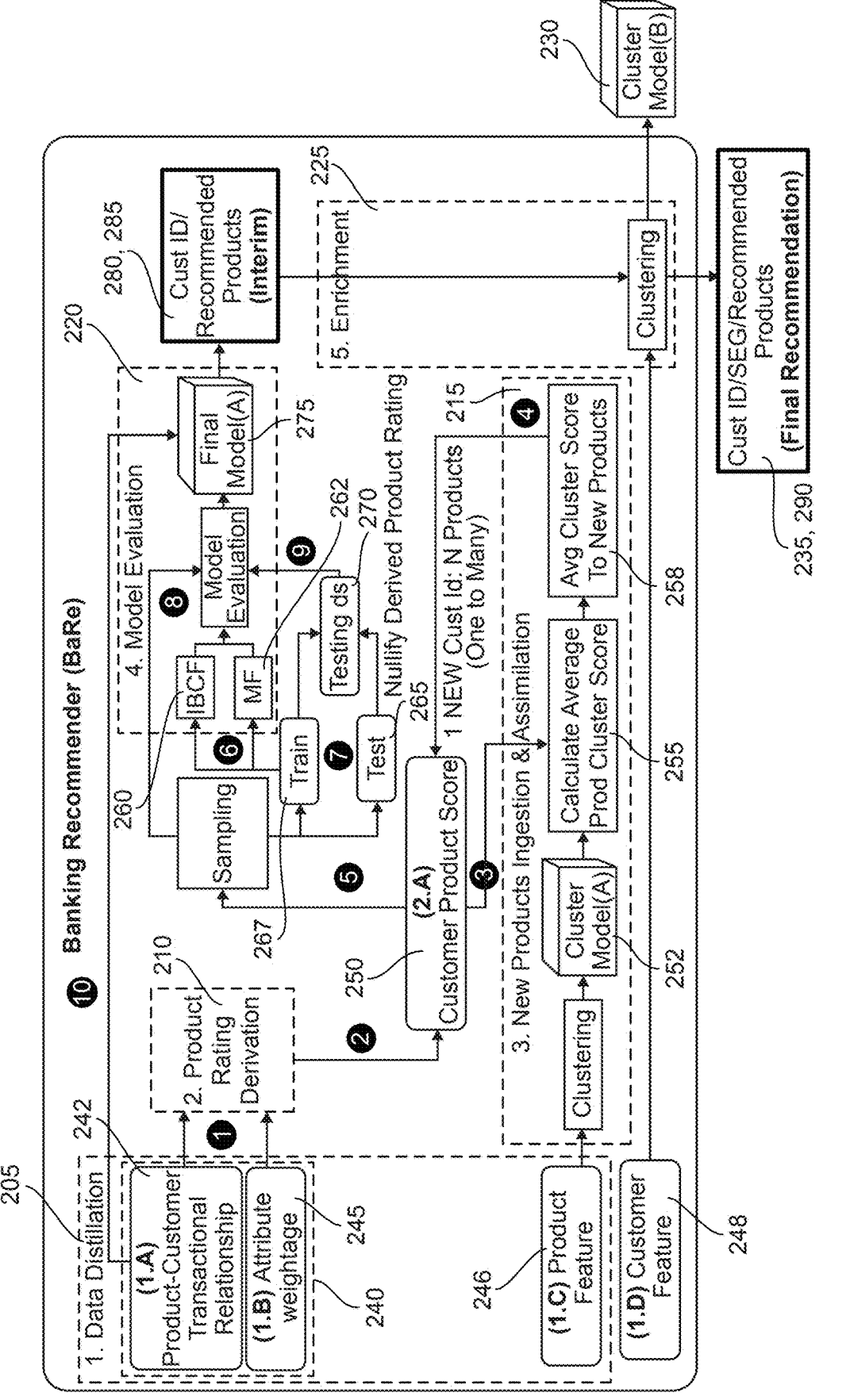
FIG. 2 is a simplified block diagram of a Resource Recommender subsystem according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

In some industries, such as banking and data mining, users typically engage with products that facilitate the allocation and storage of resources. Resource allocation products provide individuals or entities with the ability to obtain and utilize resources that they do not currently possess, with the understanding that these resources will be returned or compensated for over time (e.g., advances or loans). These products enable users to fulfill immediate needs or invest in opportunities that require more resources than they have on hand. Resource storage products allow individuals or entities to securely store or grow their resources (e.g., deposits or investments). These services often provide returns or benefits on the stored or invested resources, helping users accumulate wealth or save for future needs.

Resource allocation and storage products have distinct transactional characteristics that make them unique from many consumable products such as clothing or automobiles. These characteristics include:

Extended consumption tenure of resource allocation and storage products, which are across multiple years.

Infrequent purchase of such products e.g., home loan purchase is mostly a one-time event in an individual lifetime. Multiple home loans are rare occurrences.

Sparse product features. The product differentiation is primarily limited to interest rates, tenure, and applicable principal amounts. There may be additional applicable consumer profiles for which these products are made available.

Transitory nature of the feedback. Feedback is not isolated one-time static event but may undergo transition during the tenure of the product engagement.

As discussed above, a recommender system, or a recommendation system, is a subclass of information filtering system that provides suggestions for items that are most pertinent to a particular user. Recommender systems are particularly useful when an individual needs to choose an item from a potentially overwhelming number of items or products that a service may offer. The goal of the recommender systems is to predict a rating that would be given by a user to an item. Items for which the predicted rating is high, are recommended to the user such that the number of items for consideration by the user are reduced and ideally more pertinent/personalized for the given user.

The fundamental recommendation techniques prevalent in most industries are the item-based recommendation, also known as item-item collaborative filtering or Item based collaborative Filtering (IBCF), Content-Based Filtering, and Matrix Factorization. IBCF is a standard recommendation technique that looks for similar items based on items users have already liked or positively interacted with over time. The approach typically uses cosine similarity based on users, items, and ratings to predict and recommend new but similar items to the user. Content-Based Filtering techniques leverage machine learning models to predict and recommend new but similar items to the user. Recommending products based on their characteristics is only possible if there is a clear set of features for the product and a list of the user's choices. Matrix Factorization is yet another collaborative filtering technique that can use algorithms or models such as Singular Value Decomposition (SVD) to factorize a matrix. Other algorithms include PCA or Autoencoders for dimensionality reduction in instances in which machine learning models such as neural networks are used to predict a matrix. Gradient descent is an exemplary supervised machine learning technique that can be used to train machine learning models to predict the matrix, which iteratively minimize a loss function such as root mean square error (RMSE) so that the predicted matrix has similar output with the true values (ground truths). IBCF and Matrix Factorization are both considered collaborative filtering techniques for recommender systems, and both consume customer ranking data—customers, items, and rank.

However, all these conventional approaches cannot be used as-is for recommending resource allocation and storage products due to the systemic constraints. Each of these approaches have their own challenges when applied to the resource allocation and storage products, including the following:

Resource allocation and storage products by virtue of their distinctive characteristics such as long tenure, either do not have a rating capture mechanism or the experience evaluation period is across multiple years.

Accepted shortcoming of the collaborative model approach is, if an item/product is not seen during the training of a model, the system cannot effectively query the model with this new item/product. This issue is known as a cold-start problem.

Considering new resource allocation and storage products are getting introduced by entities and new users are being serviced by the entities, this becomes a significant challenge.

Challenges of Discrimination-Differences between the resource allocation and storage products features can be statistically insignificant considering that product features are sparse, e.g., interest rates, where products are varied based on rate differences ranging from mostly a few decimal points (see FIG. 1).

All of these challenges and short comings demonstrate that there is a need to develop an alternative mechanism to build a recommender system, specific to resource allocation and storage products, that will address the unique transactional characteristics and known cold start issues common with these products.

To address the unique transactional characteristics and known cold start issues common with these products, disclosed herein is a training and deployment framework for a machine learning based recommendation system. The training and deployment framework is architected around two separate subsystems, that work independently to deliver the recommendations for a given user (e.g., customer). The two separate subsystems are described herein as the (i) Resource Recommender (RR), and (ii) the Runtime Consumption Unit (RCU). The RR is important to the proposed solution as it is designed to overcome the systemic constraints of traditional approaches to recommend resource allocation and storage products—specifically the unique transactional characteristics of resource allocation and storage products and the cold start scenarios with the introduction of new resource allocation and storage products, as described in further detail below. The RCU enables prompt response to a given user based on the recommendation outcomes of RR which are persisted in one or more databases. One of the unique features or aspects of the RCU is the ability to overcome the cold start scenario for new users having no transactional history, as described in further detail below.

In one embodiment, a computer-implemented method is provided for that comprises: deriving product ratings for products using data from a product-user transactional relationship data model and an attribute-weightage data model, wherein: the products facilitate allocation and storage of resources, the product-user transactional relationship data model stores identifiers for users in association with both positive and negative attributes from product user relationship interactions with the products, and the product ratings are derived and stored in a user product score table in association with identifiers for users and the products; sampling the user product score table to generate subsets of data comprising examples, wherein the subsets of data include a training data set and testing data set, and each of the examples comprises a product rating in association with an identifier for a user and a product; training, using the training data set, machine learning models for a task of predicting product ratings, wherein the training comprises predicting, by each of the machine learning models, product ratings for each user and a product; evaluating, using the testing data set, performance of the machine learning models, wherein the evaluating comprises comparing the predictions for the product ratings against the derived product ratings for the products in the testing data set to calculate error in the predictions; selecting one of the machine learning models for production use in predicting product ratings based on the evaluating; predicting, using the selected machine learning model, new product ratings for the products in the product-user transactional relationship data model; and storing the new product ratings in association with the identifiers for the users within a persistent database object that represents an interim recommendation.

As used herein, when an action is "based on" something, this means the action is based at least in part on at least a part of the something.

As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

II. Resource Recommender (RR)

The Resource Recommender (RR) subsystem is designed to allow information to flow, sequentially through a series of five stages, as shown is FIG. 2. These five stages include (1) Data Distillation 205, (2) Product Rating Derivation 210, (3) New Product Ingestion and Assimilation 215, (4) Model Evaluation 220, and (5) Enrichment 225 to ultimately render the outputs of Customer Cluster Model [B] 230 and Final Recommendation 235, which may be persisted in one or more databases for future consumption by the Runtime Consumption Unit (RCU). The first three stages (1)-(3) pertain to data synthesis techniques that are used to generate data to be used for the training, validation, and testing datasets. The next stage (4) pertains to training, validating, and testing machine learning models using the data to generate a machine learning model capable of predicting product ratings for each user and a product no matter whether the user and/or product are new with limited features. The final stage (5) pertains to enhancing predictions made by the machine learning model with additional features to assist in recommending products to new users.

(1) Data Distillation 205

The Data Distillation 205 stage is designed to be a foundational data platform to the disclosed solution. The Data Distillation 205 stage collates and distills quantified user product interactions over the tenure of product usage using various data models including Accumulated Customer Lifecycle Event (ACLE) data model 240 which comprises sub data models: (a) Product-Customer Transactional Relationship data model 242 and (b) Attribute-weightage data model 245. The core considerations in designing the ACLE data model are:

Data is captured throughout the tenure of engagement with the user.

Infrequent and one-off product acquisition as well as repeat acquisition are accounted for by the model.

Documents both favorable and unfavorable life cycle events.

The various data models further include: (c) Product features data model 246 and (d) Customer features data model 248.

(a) Product-Customer Transactional Relationship Data Model 242

The structure of the Product-Customer Transactional Relationship data model 242 is shown in FIG. 3A. The model captures both positive and negative attributes from product user relationship interaction (transaction history) throughout the life cycle. The POSITIVE_ATTRIBUTE_N and NEGATIVE_ATTRIBUTE_N represents the nth positive and negative attributes respectively. The positive and negative attributes are determined by the entity offering the product and are derived from the life cycle events of the product user relationship. All attributes are represented by numerical values. FIG. 3B illustrates examples of various attributes for the nth positive and negative attributes with respect to a banking exemplary use case. FIG. 3C shows a sample data representation of the Product-Customer Transactional Relationship data model 242, when implemented using loan products as shown in the Example 1 illustrated in FIG. 3B. To avoid scenarios, where products with higher number of positive attributes get biased towards a higher score and products with a larger number of negative attributes get biased towards a lower score, the design of the data model may have an equal number of positive and negative attributes for product types. Although many of the embodiments describe herein will be illustrated and build on this banking exemplary use case, it should be understood by those of ordinary skill in the art that such embodiments could also be implemented for other use cases and industries where users engage with products that facilitate the allocation and storage of resources.

(b) Attribute-Weightage Data Model 245

The structure of the Attribute-weightage data model 245 is shown in FIG. 3D. The model captures the impact weights, positive or negative, on the attribute value, on a scale of (−1.00 to 1.00) as determined by the entity offering the product. FIG. 3E illustrates an Example 2 of various attribute weightage that could be applied to attributes associated with respect to the banking exemplary use case.

(c) Product Features Data Model 246

The structure of the Product features data model 246 is shown in FIG. 3F. The model captures all product features deemed relevant by the entity. For example, the PRODUCT-_CODE attribute uniquely identifies a record and the PRO-DUCT_TYPE attribute identifies the product group, e.g., loan, deposit etc, and the FEATURE_2-N attributes represent other features of the product group and/or product. All attributes are represented by numerical or nominal values. In certain instances, only authorized and open products are considered for inclusion in the model. FIG. 3G illustrates an Example 3 of various product features that could be represented with respect to the banking exemplary use case.

(d) Customer Features Data Model 248

The structure of the Customer features data model 248 is shown in FIG. 3H. The model captures all customer features deemed relevant by the entity. For example, the CUSTOM-ER_ID attribute uniquely identifies a record and the CUS-TOMER_TYPE attribute identifies the customer group, e.g., person, entity, etc., and the FEATURE_2-N attributes represent other features of the customer group and/or customer. All attributes are represented by numerical or nominal values. In certain instances, only authorized and open customers are considered for inclusion in the model. FIG. 3I illustrates an Example 4 of various customer features that could be represented with respect to the banking exemplary use case.

(2) Product Rating Derivation 210

The absence of a product rating mechanism in some industries such as banking necessitates derivation of a product rating using alternative approaches. As shown in FIG. 2 (indicated by paths 1 and 2), the Product Rating Derivation 210 stage comprises a workflow for the intake and processing of ACLE data, represented by Product-Customer Transactional Relationship data model 242 and Attribute-weightage data model 245, to arrive at an implicit rating of products (also described herein as customer product score) based on the transactional relationship of a customer during the consumption life cycle of a product. The product rating derivation workflow is a two-stage process comprising (a) matrix representation of data and (b) a rating derivation routine.

(a) Matrix Representation of Data

The matrix representation of data process comprises creating a product-customer matrix [A] and an attribute-weighting matrix [B]. This process of creating matrix [A] and [B] in general comprises determining the number of rows and columns in the data (e.g., data in Product-Customer Transactional Relationship data model 242 or the Attribute-weightage data model 245). An empty matrix is then created with the same number of rows and columns. For example, if the data table or model has 100 rows and 5 columns of data, a 100×5 matrix data table may be created. Thereafter, an iterative process is initiated that loops through each row of the data. For each row, loop through each value in the row and place it in the corresponding position in the matrix. For example, if the first value in the first row of the data is 0.2, then 0.2 is inserted in the first row, first column of the matrix. This process is repeated for all values in the row, then move to the next row and continue until the entire matrix is populated. After populating the matrix, a validation check may be performed to ensure that the dimensions are correct and that all values are accurately placed in their corresponding positions. This process of creating matrix [A] and [B] may be implemented using an algorithm defined in a programming language such as Python (e.g., with Pandas and NumPy).

In some instances, prior to creating a matrix, the data from the data table or model is normalized. There are several normalization techniques that may be used such as Min-Max normalization. This method scales the data to a fixed range, usually [0, 1]. Thereafter, the matrix is created, and the normalized data is populated into the matrix as explained above.

Figure 3L:
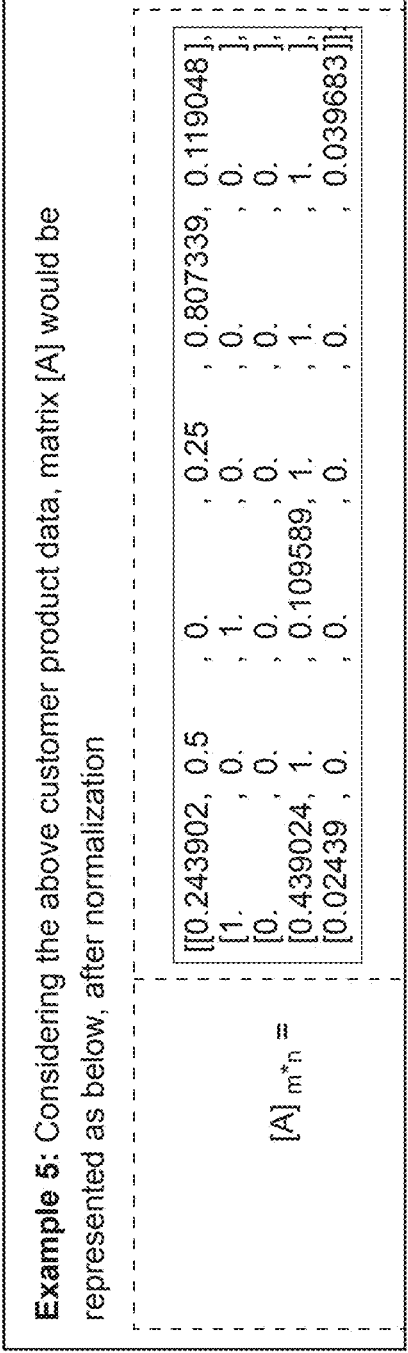
FIGS. 3A-3AA show various models, matrix, and examples associated with processing by the Resource Recommender subsystem according to various embodiments.

With respect to creating the product-customer matrix [A], the data from the Product-Customer Transactional Relationship data model 242 is used. In some instances, to handle possible scenarios, where values could be across different scales introducing unintended bias, the customer-product data in the Product-Customer Transactional Relationship data model 242 may be normalized before creating the product-customer matrix [A]. For example, after normalization, using the highlighted portion of the table of size m, n, as shown in FIG. 3J, a product-customer matrix [A] can be created, as shown in FIG. 3K, where: (m) represents the row number from the Product-Customer Transactional Relationship data model 242; (n) represents the column number from the Product-Customer Transactional Relationship data model 242; and $i_{mn}$ is the normalized value for $m^{th}$ row and $n^{th}$ column from the Product-Customer Transactional Relationship data model 242. FIG. 3L illustrates an Example 5 where the product-customer matrix [A] is populated with normalized data from the Product-Customer Transactional Relationship data model 242 shown in FIG. 3J.

Figure 3M:
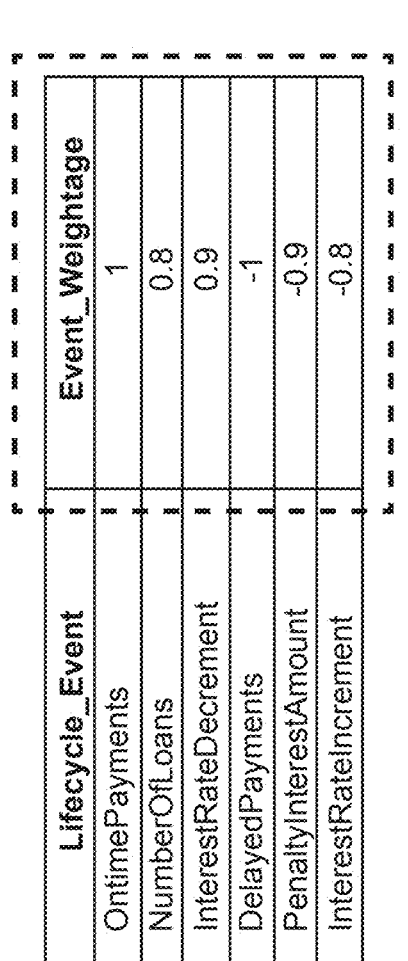

With respect to creating the attribute-weighting matrix [B], data from the Attribute-weightage data model 245 is used. For example, using the highlighted portion of the table of size a, b, as shown in FIG. 3M, an attribute-weighting matrix [B] can be created, as shown in FIG. 3N, where: (a) represents the row number from the Attribute-weightage data model 245; (b) represents the column number from the Attribute-weightage data model 245; and $i_{ab}$ is the value for $a^{th}$ row and $b^{th}$ column from the Attribute-weightage data model 245, e.g., 1 is $i_{11}$ and 0.8 is $i_{21}$. FIG. 3O illustrates an Example 6 where the attribute-weighting matrix [B] is populated with data from the Attribute-weightage data model 245 shown in FIG. 3N.

(b) Rating Derivation Routine

The rating derivation routine is a multi-step process to generate a product rating on a predefined scale, e.g., a scale of 1-5 or 1-10. The first step of the rating derivation routine is to encode the series made from each column of the customer-product matrix $[A]_{m*n}$ as referenced in (1) (see FIG. 3K), to create matrix $[C]_{m*n}$ using quantile with incremental percentiles of a given value such as 10, as shown in FIG. 3P, where m represents the row number from the Product-Customer Transactional Relationship data model 242; n represents the column number from the Product-Customer Transactional Relationship data model 242, and $q_{mn}$ is the quantile of $m^{th}$ row and $n^{th}$ series of matrix [A] as shown in (1) (see FIG. 3K), e.g., considering the third column series. FIG. 3Q shows the product-customer matrix [A] as populated with normalized data from the Product-Customer Transactional Relationship data model 242 and FIG. 3R shows illustrates an Example 7 the encoding in quantiles the values from the product-customer matrix [A], e.g., the quantile for [0, 1.0, 0, 0.109589, 0] with incremental percentiles of 10 would be [1, 10, 1, 2, 1].

The second step of the rating derivation routine is to generate a provisional rating matrix $[D]_{x*y}$ by multiplying matrix $[C]_{m*n}$ referenced in (3) (see FIG. 3P), with matrix $[B]_{a*b}$ referenced in (2) (see FIG. 3N), as shown in FIG. 3S. The resultant $[D]_{x*y}$ will have a matrix structure, as shown in FIG. 3T, where x represents the number of rows, which is equal to the number of columns of $[C]_{m*n}$ referred in (3) (see FIG. 3P); y represents a value of 1, being a column matrix; and $p_{xy}$ is the provisional rating of $m^{th}$ row and $1^{st}$ column on a scale of 10. FIG. 3U illustrates an Example 8 where matrix $[C]_{m*n}$ referenced in (3) (see FIG. 3P) and $[B]_{a*b}$ referenced in (2) (FIG. 3N) and performing a matrix multiplication, yields a provisional rating column matrix.

The final step of the rating derivation routine is to encode the provisional rating matrix $[D]_{x*y}$ as shown in (4) (see FIG. 3T) to create a final rating matrix $[S]_{m*n}$ using quantile with incremental percentiles of a given value such as 20, to obtain ratings on a predefined scale such as 5, as shown in FIG. 3V, where m represents the number of rows, which is equal to the number of rows of $[C]_{m*n}$ referred in (4) (see FIG. 3T); n represents a value of 1, being a column matrix; and $s_{xy}$ is the final rating of $m^{th}$ row and $1^{st}$ column on a scale of 5. FIG. 3W illustrates an Example 9 where the provisional rating matrix $[D]_{x*y}$ referenced in (4) (see FIG. 3T) yields the final rating column matrix (Customer Product Score table 250) on a scale of 5.

(3) New Product Ingestion and Assimilation 215

New products, when created by the entity, are added as new records to the Product features data model 246, as shown in FIG. 2. Clustering is performed on the Product features data model 246, as per product type, to create the cluster model [A] 252. Clustering is a technique used to group similar data points (e.g., products) together based on certain characteristics (e.g., features or characteristics of the products). There are various clustering algorithms that may be used to create the cluster model [A] 252. Each clustering algorithm being suitable for different types of data and purposes. Example algorithms include K-Means Clustering: Partitions the data into k clusters by minimizing the variance within each cluster; Hierarchical Clustering: Builds a tree of clusters by either agglomeratively merging smaller clusters or divisively splitting larger clusters; and Density-Based Spatial Clustering of Applications with Noise: Forms clusters based on the density of data points, identifying clusters of arbitrary shape and handling noise.

In certain instances, where the cluster model [A] 252 is created using K-Means Clustering, as an example, the algorithm includes:

1. Initialize Centroids: Randomly select k data points as the initial centroids (the center points of the clusters).
2. Assign Data Points to Clusters: Assign each data point to the nearest centroid, forming k clusters.
3. Update Centroids: Calculate the mean of all data points in each cluster to update the centroids' positions.
4. Repeat: Repeat the assignment and update steps until the centroids no longer change significantly or until a predetermined number of iterations is reached.

All products belonging to the same cluster as per the product type of the product, are identified as a given 'Group of Products' for the cluster model [A] 252. The cluster model [A] 252 is comprised of centroids and cluster assignments. The centroids are the coordinates of the centroids after the algorithm converges. Each centroid represents the center of a cluster for each 'Group of Products'. Cluster assignments are implemented with an array indicating which cluster each data point (e.g., product) belongs to and for each data point there is an associated cluster label (e.g., 0, 1, 2 for three clusters).

As shown in FIG. 2 (indicated by path 3), an average 'Group Products' rating 255 is then calculated for each cluster or 'Group of Products' using the cluster model [A] 252 and final rating column matrix (Customer Product Score table 250). For example, each data point (e.g., product) assigned to a cluster or 'Group of Products' is identified using the cluster model [A] 252, the corresponding rating for each data point assigned to a cluster is identified from the final rating column matrix (Customer Product Score table 250), and then the rating for each data point assigned to a cluster are averaged to obtain an average 'Group Products' rating 255 for the cluster. Any new product(s) 258 that is/are created by the entity and determined to be within a given cluster using the cluster model [A] 252 are then assigned 258 the value of the average 'Group Products' rating 255 for the cluster. FIG. 3X illustrates an Example 10 where the new record for a product, e.g., 'NEW'~<NEW PRODUCT>, with the assigned rating, e.g., <CALCULATED GROUP PRODUCTS RATING>, is inserted (see path 4 of FIG. 2) in the final rating column matrix (Customer Product Score table 250). Consequently, any new product can be assigned 258 a rating even when there is no historical transactional data to derive the rating as described above.

The derived output of Product Rating Derivation 210 and New Product Ingestion and Assimilation 215 are captured for each customer-product combination within the final rating column matrix (Customer Product Score table 250) and persisted in one or more databases, as shown in FIGS. 3Y and 2 (indicated by paths 2 and 4).

(4) Model Evaluation 220

Examples of customer-product combinations within the final rating column matrix (Customer Product Score table 250) are used to train, test, and evaluate machine learning models (also described herein as recommendation models) for predicting the preferences or ratings that a user would give to an item or product. As shown in FIG. 2 (indicated by path 5), the process starts by sampling the final rating column matrix (Customer Product Score table 250) for the examples to ensure that the machine learning models can generalize well to new, unseen data. Sampling includes defining the split for the dataset into various subset of data to be used for training, testing, and evaluating machine learning models. Typically, the dataset is split into three subsets including a Training Set: Used to train the model. This is the largest portion of the dataset. Validation Set: Used to tune hyperparameters and select the best model. This set helps prevent overfitting. Test Set: Used to evaluate the final model's performance. This set simulates new, unseen data to assess how well the model generalizes. A common split is: 70-80% for training, 10-15% for validation, and 10-15% for testing, however, other splits can be used. Sampling further includes selecting examples for the subsets using various sampling techniques including random sampling, stratified sampling, and cross-validation. Examples may be selected until a total number of examples (e.g., 100,000 examples) have been selected from the data set, e.g., >1,000,000 examples in the final rating column matrix (Customer Product Score table 250). This process ensures the machine learning models are trained on representative data, tuned to avoid overfitting, and evaluated on unseen data to assess its generalization performance.

Figure 6A:
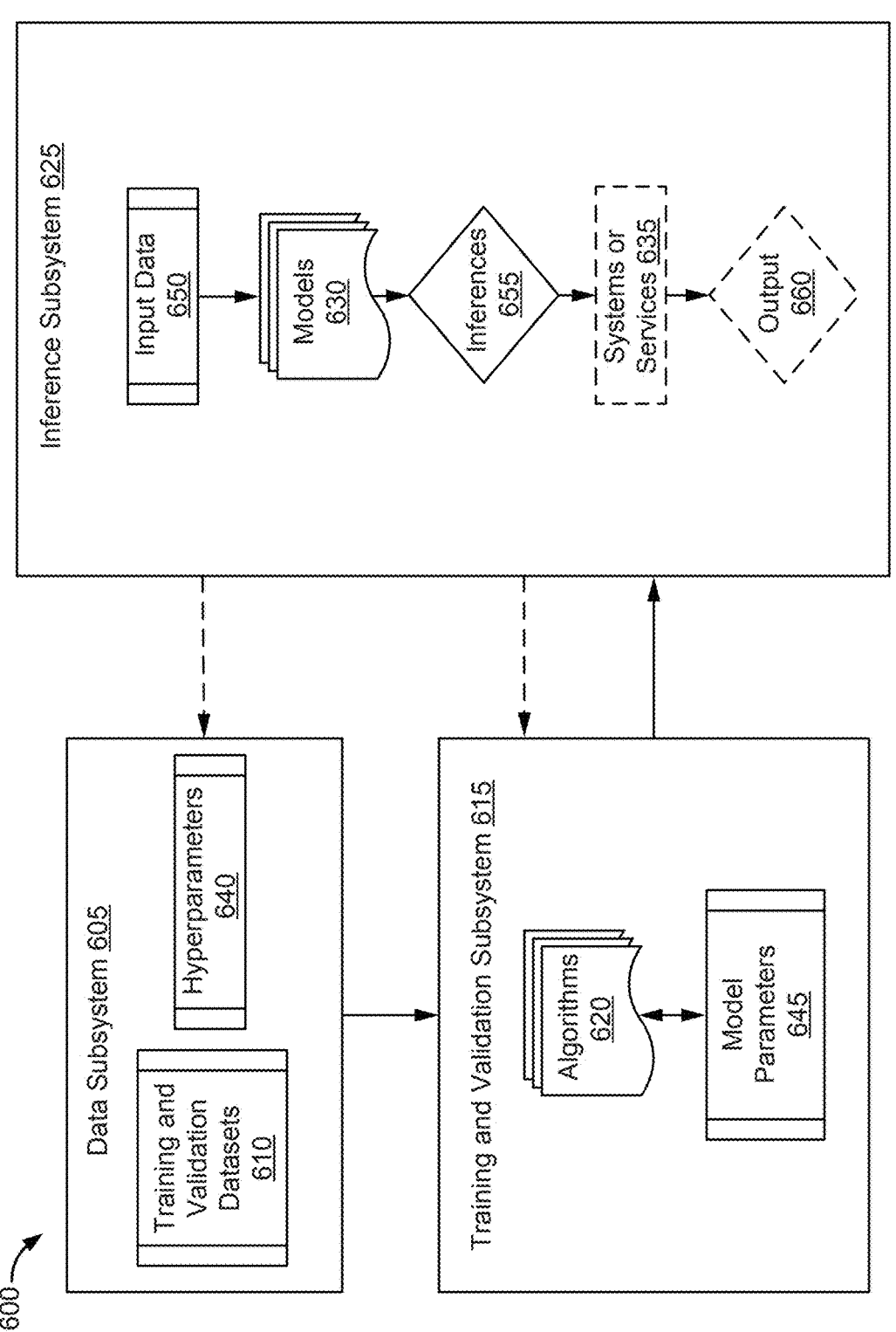
FIG. 6A is a simplified block diagram of a machine learning pipeline comprising several subsystems that work together to train, validate, and implement one or more machine learning models according to various embodiments.

Once the sampling is complete, copies of the Training Set and Validation Set are used to train recommender models using Item-Based Collaborative Filtering (IBCF) and Matrix Factorization (MF) algorithms 260; 262, identified by path 6 in FIG. 2, as described in greater detail herein with respect to FIG. 6A. Additionally, the derived product rating is nullified from the examples within a copy of the Test Set 265 to obtain a Modified Test Set and the Modified Test Set is merged with a copy of the Training Set 267 to obtain a Testing Data Set 270, identified by path 7 in FIG. 2. Additionally, copies of the Training Set, Validation Set, and Test Set are maintained together as an 'Actual Dataset' to evaluate the recommendation models, identified by path 8 in FIG. 2. The Actual Dataset maintains all information including the derived product rating such that it can be used for evaluation of model performance. The models, including those built using IBCF and MF algorithms 260; 262, are evaluated using the Testing Data Set 270 to predict the product ratings for sample customers and products, identified by path 9 in FIG. 2. The predictions for the product ratings are compared against the Actual Dataset to calculate the error in predictions (i.e., accuracy). In some instances, the metric used to measure accuracy is the F1 Score. The F1 score provides a balanced measure of a model's accuracy by considering both precision and recall. The model with the higher F1 Score is selected as the Final Model (A) 275.

The Final Model (A) 275 is used to predict the product rating of the complete Product-Customer records present in Product-Customer Transactional Relationship data model 242, identified by path 10 in FIG. 2. The preliminary outcome of the RR subsystem is a persistent database object 280 comprising customer identifiers (IDs) and the recommended list of products for each customer determined based on the predicted product ratings of the complete Product-Customer records present in Product-Customer Transactional Relationship data model 242. The persistent database object 280 represents an Interim Recommendation as shown in Example 11 (see FIG. 3Z).

(5) Enrichment 225

As part of the enrichment routine, the customer features from the Customer features data model 248 are clustered as per customer type. Clustering is performed on the Customer features data model 248 per customer type, to create the Customer Cluster Model [B] 230. As described above in detail, clustering is a technique used to group similar data points (e.g., customers) together based on certain characteristics (e.g., features or characteristics of the customers). There are various clustering algorithms that may be used to create Customer Cluster Model [B] 230. Each clustering algorithm being suitable for different types of data and purposes. Example algorithms include K-Means Clustering, Hierarchical Clustering, and Density-Based Spatial Clustering of Applications with Noise. All customers belonging to the same cluster as per the customer type of the customer, are identified as a given 'Group of Customers' for Customer Cluster Model [B] 230. Customer Cluster Model [B] 230 is comprised of centroids and cluster assignments. The centroids are the coordinates of the centroids after the algorithm converges. Each centroid represents the center of a cluster for each 'Group of Customers'. Cluster assignments are implemented with an array indicating which cluster each data point (e.g., customer) belongs to and for each data point there is an associated cluster label (e.g., 0, 1, 2 for three clusters).

Once the customers and their respective clusters are identified, identifiers for the clusters (Cluster IDs) are added to the persistent database object 280 for the Interim Recommendation 285 as per customer ID to obtain a revised persistent database object 290 for the Final Recommendation 235 (final outcome of the RR subsystem). The revised persistent database object 290 comprises customer identifiers (IDs), the recommended list of products for each customer, and the cluster identifier for a given 'Group of Customers' identified for each customer as shown in Example 12 (see FIG. 3AA). The number of products within the list of products that can be recommended to a customer may be determined by a parametric setting (e.g., top 20). The Customer Cluster Model [B] 230 is persisted as a database object along with the revised persistent database object 290 for the Final Recommendation 235 in one or more databases.

III. Runtime Consumption Unit (RCU)

During production phase, a user-initiated query for a customer associated with a known customer ID invokes the Runtime Consumption Unit (RCU) subsystem to return the recommended products for the customer. The RCU subsystem is designed to allow information to flow, sequentially through a series of two stages, as shown is FIG. 4. The two stages include (1) Existing Customers 405 and (2) New Customers 410. The inclusive design of the process flow addresses both of the following business scenarios: (i) existing customers, with a transaction history and/or recommendations, and (ii) new customers, without a transaction history and/or recommendations, i.e., cold start scenario.

(1) Existing Customers 405

Figure 4:
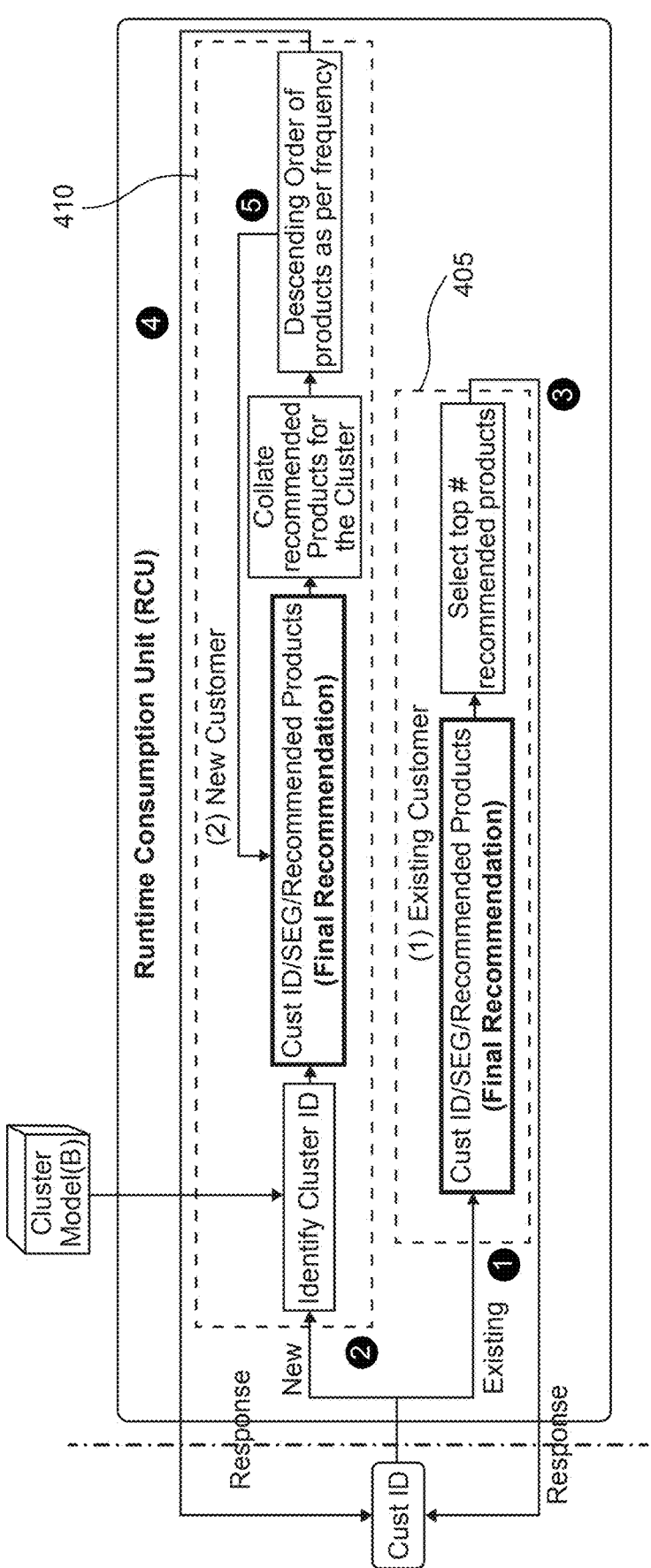
FIG. 4 is a simplified block diagram of a Runtime Consumption Unit subsystem according to various embodiments.

For an existing customer, indicated by path 1 in FIG. 4, a query is executed for the customer ID associated with existing customer on the revised persistent database object 290 for the Final Recommendation 235 to acquire the requisite response (e.g., products to be recommended to the customer), as indicated by path 3 in FIG. 4. A number of products to be recommended to the customer associated with the customer ID are selected and communicated to the customer. The number of products to be recommended to the customer may be determined by a parametric setting (e.g., top 3).

(2) New Customers 410

Figures 5A, 5B:
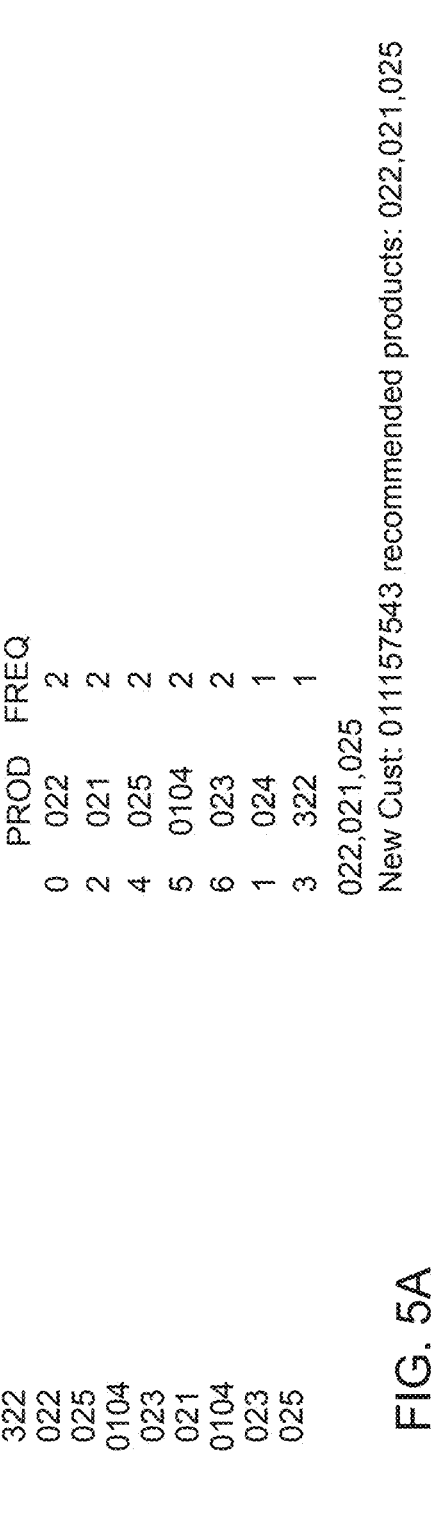
FIGS. 5A and 5B show various examples associated with processing by the Runtime Consumption Unit subsystem according to various embodiments.

For a new customer, indicated by path 2 in FIG. 4, which will not have any record in the revised persistent database object 290 for the Final Recommendation 235, an identifier for a cluster (Cluster ID) is predicted for the new customer based on features of the new customer being similar to features associated with a given cluster, by employing Customer Cluster Model [B] 230. Once an identifier for a cluster (Cluster ID) is predicted, the cumulative recommended products of all customers falling into the same cluster as the new customer, by virtue of similar traits, will be collated, as shown by the example in FIG. 5A. All the products of the identified cluster will be ranked in descending order as per their frequency (see FIG. 5B). As per the parametric setting, a number of products (e.g., top 3) to be recommended to the customer associated with the customer ID are selected and communicated to the customer, as indicated by path 4 in FIG. 4.

Additionally, in parallel or subsequent to identifying and communicating the recommended products to the customer, the recommended products are updated/inserted in the revised persistent database object 290 for the Final Recommendation 235 in association with the customer ID of the customer, as indicated by path 5 in FIG. 4. This is done to ensure that the next time a query is received by the customer, the RCU subsystem can query recommended products for the customer using the customer ID via path 1.

IV. Machine Learning Pipeline

FIG. 6A shows a block diagram of a machine learning pipeline 600 comprising several subsystems that work together to train, validate, and implement one or more machine learning models (e.g., recommender models described with respect to FIG. 2) in accordance with various embodiments. Machine learning pipeline 600 may be executed as part of or in addition to the (i) RR subsystem and the RCU subsystem described with respect to FIGS. 2 and 4. The machine learning pipeline 600 comprises a data subsystem 605 for collecting, generating, preprocessing, and labeling of training and validation datasets 610, training and validation subsystem 615 that facilitates the training and validation of one or more machine learning algorithms 620, and inference subsystem 625 for deploying and implementing one or more trained machine learning models 630 independently or in combination with one or more other systems or services 635 for downstream processes.

As used herein, machine learning algorithms (also described herein as simply algorithm or algorithms) are procedures that are run on datasets (e.g., training and validation datasets) and perform pattern recognition on datasets, learn from the datasets, and/or are fit on the datasets. Examples of machine learning algorithms include linear and logistic regression, decision trees, artificial neural networks, k-means, and k-nearest neighbor. In contrast, machine learning models (also described herein as simply model or models) are the output of the machine learning algorithms and are comprised of model data and a prediction algorithm. In other words, the machine learning model is the program that is saved after running a machine learning algorithm on training data and represents the rules, numbers, and any other algorithm-specific data structures required to make inferences. For example, a linear regression algorithm may result in a model comprised of a vector of coefficients with specific values, a decision tree algorithm may result in a model comprised of a tree of if—then statements with specific values, or neural network, backpropagation, and gradient descent algorithms together result in a model comprised of a graph structure with vectors or matrices of weights with specific values.

(1) Data

Data subsystem 605 is used to collect, generate, preprocess, and label data to be used to train and validate one or more machine learning algorithms 620. The data collection can include exploring various data sources such as public datasets, private data collections, or real-time data streams, depending on a project's needs. In some instances, a data source is a public or online repository of information or examples pertinent to a general or target domain space. Many domains have publicly available datasets provided by governments, universities, or organizations. For example, many government and private entities offer datasets on healthcare, environmental data, and more through various portals. For proprietary needs, data might be available through partnerships or purchases from private companies that specialize in data aggregation. In certain instances, a data source is the final rating column matrix (Customer Product Score table 250) and the training and validation datasets 610 include examples sampled using the techniques described herein with respect to FIG. 2. Once a data source is identified, data subsystem 605 can be used to collect data through appropriate methods such as downloading from online repositories, web scraping, using APIs for real-time data, creating datasets through surveys and experiments, or by deploying sensors in the environment.

Data synthesis and/or data augmentation techniques may be implemented using data subsystem 605 to generate data to be used for the training and validation datasets 610 (e.g., when data is insufficient from public datasets and/or private data collections). Data synthesizing involves creating entirely new data points from scratch. This technique may be used when real data is insufficient, too sensitive to use, or when the cost and logistical barriers to obtaining more real data are too high. The synthesized data should be realistic enough to effectively train a machine learning model, but distinct enough to comply with regulations (e.g., copyright and data privacy), if necessary. Techniques such as Generative Adversarial Networks (GANs) or Variational Autoencoders (VAEs) may be used to generate new data examples. These models learn the distribution of real data and attempt to produce new data examples that are statistically similar but not identical. In certain instances, the new data examples are generated via Data Distillation 205, (2) Product Rating Derivation 210, (3) New Product Ingestion and Assimilation 215, as described in detail above with respect to FIG. 2.

Data augmentation, on the other hand, refers to techniques used to artificially expand the size of a dataset by creating modified versions of existing data examples. The primary goal of data augmentation is to increase variation in the data in order to make the model more robust to variations it might encounter in the real world, thereby improving its ability to generalize from the training data to unseen data. This is especially common in image and speech recognition tasks but is applicable to other data types as well. For images, data augmentation may include rotations, flipping, scaling, or altering the lighting conditions. For text, data augmentation may include synonyms replacement, back translation, or sentence shuffling. For audio, data augmentation may include changes made to pitch, speed, or background noise.

Preprocessing may be implemented using data subsystem 605 in the data collection process, serving as a bridge between raw data acquisition and effective model training. The primary objective of preprocessing is to transform raw data into a format that is more suitable and efficient for analysis, ensuring that the data fed into machine learning algorithms is clean, consistent, and relevant. This step can be useful because raw data often comes with a variety of issues such as missing values, noise, irrelevant information, and inconsistencies that can significantly hinder the performance of a model. By standardizing and cleaning the data beforehand, preprocessing helps in enhancing the accuracy and efficiency of the subsequent analysis, making the data more representative of the underlying problem the model aims to solve.

Several example techniques implemented in preprocessing include data cleaning, normalization, feature extraction, and dimensionality reduction. Data cleaning may involve removing duplicates, filling in missing values, or filtering out outliers to improve data quality. Normalization, involves scaling numeric values to a common scale without distorting differences in the ranges of values, which helps prevent biases in the model due to the inherent scale of features. Feature extraction involves transforming the input data into a set of useable features, possibly reducing the dimensionality of the data in the process. For instance, in text analysis, raw text data might be converted into a bag-of-words model or into TF-IDF scores to capture the relevance of words in documents. Dimensionality reduction techniques like Principal Component Analysis (PCA) or Autoencoders may be used to reduce the number of random variables under consideration, by obtaining a set of principal variables. These techniques not only help in reducing the computational load on the model but also in mitigating issues like overfitting by simplifying the data without losing critical information.

In the instance that machine learning pipeline 600 is used for supervised or semi-supervised learning of machine learning models, labeling techniques can be implemented as part of the data collection. The quality and accuracy of data labeling directly influence the model's performance, as labels serve as the definitive guide that the model uses to learn the relationships between the input features and the desired output. Particularly in complex domains such as image recognition, natural language processing, or medical diagnosis, precise and consistent labeling is important because it provides the ground truth or target outcomes against which the model's predictions are compared and adjusted during training. Effective labeling ensures that the model is trained on correct and clear examples, thus enhancing its ability to generalize from the training data to real-world scenarios.

Labeling techniques can vary significantly depending on the type of data and the specific requirements of the project. Manual labeling, where human annotators label the data, is one method that can be used. This approach may be useful when a detailed understanding and judgment are required, such as in labeling medical images or categorizing text data where context and subtlety are important. However, manual labeling can be time-consuming and prone to inconsistency, especially with a large number of annotators. To mitigate this, semi-automated labeling tools may be used as part of data subsystem 605 to pre-label data using algorithms, which human annotators may then review and correct as needed. Another approach is active learning, a technique where the model being developed is used to label new data iteratively. The model suggests labels for new data points, and human annotators may review and adjust certain predictions such as the most uncertain predictions. This technique optimizes the labeling effort by focusing human resources on a subset of the data, e.g., the most ambiguous cases, improving efficiency and label quality through continuous refinement.

Once collected, generated, preprocessed, and/or labeled, the data may then be split into the training and validation datasets 610 (e.g., as described with respect to Model Evaluation above and FIG. 2). The data collected is typically split into at least three subsets: training, validation, and testing. The training set is used to fit the model, where the machine learning model learns to make inferences based on the training data. The validation set, on the other hand, is utilized to tune hyperparameters and prevent overfitting by providing a sandbox for model selection. Finally, the test set serves as a new and unseen dataset for the model, used to simulate real-world application and evaluate the final model's performance. The process of splitting ensures that the model can perform well not just on the data it was trained on, but also on new, unseen data, thereby validating and testing its ability to generalize.

Various techniques can be employed to split the data effectively, with each method aiming to maintain a good representation of the overall dataset in each subset. A simple random split (e.g., a 70/20/10%, 80/10/10%, or 60/25/15%) is the most straightforward approach, where examples from the data are randomly assigned to each of the three sets. However, more sophisticated methods may be necessary to preserve the underlying distribution of data. For instance, stratified sampling may be used to ensure that each split reflects the overall distribution of a specific variable, particularly useful in cases where certain categories or outcomes are underrepresented. Another technique, k-fold cross-validation, involves rotating the validation set across different subsets of the data, maximizing the use of available data for training while still holding out portions for validation. These methods help in achieving more robust and reliable model evaluation and are useful in the development of predictive models that perform consistently across varied datasets.

Data subsystem 605 is also used to set and implement hyperparameters 640 to be optimized by the training and validation subsystem 615. The hyperparameters control the overall behavior of the models. Unlike model parameters 645 that are learned automatically during training, hyperparameters 640 are set before training begins and have a significant impact on the performance of the model. For example, in a neural network, hyperparameters include the learning rate, number of layers, number of neurons per layer, and activation functions, among others. These settings can determine how quickly a model learns, its capacity to generalize from training data to unseen data, and its overall complexity. Correctly setting hyperparameters is important because inappropriate values can lead to models that underfit or overfit the data. Underfitting occurs when a model is too simple to learn the underlying pattern of the data, and overfitting happens when a model is too complex, learning the noise in the training data as if it were signal.

(2) Training, Validating, and Testing

The training and validation subsystem 615 is comprised of a combination of specialized hardware and software to efficiently handle the computational demands required for training, validating, and testing a machine learning model. On the hardware side, high-performance GPUs (Graphics Processing Units) may be used for their ability to perform parallel processing, drastically speeding up the training of complex models, especially deep learning networks. CPUs (Central Processing Units), while generally slower for this task, may also be used for less complex model training or when parallel processing is less critical. TPUs (Tensor Processing Units), designed specifically for tensor calculations, provide another level of optimization for machine learning tasks. On the software side, a variety of frameworks and libraries are utilized, including TensorFlow, PyTorch, Keras, and scikit-learn. These tools offer comprehensive libraries and functions that facilitate the design, training, validation, and testing of a wide range of machine learning models across different computing platforms, whether local machines, cloud-based systems, or hybrid setups, enabling developers to focus more on model architecture and less on underlying computational details.

Training is the initial phase of developing machine learning models 630 where the model learns to make predictions or decisions based on data training data provided from the training and validation datasets 610. During this phase, the model iteratively adjusts its internal model parameters 645 to minimize the difference between its predictions and the actual outcomes in the training data. This process, known as fitting, is fundamental because it directly influences the accuracy and effectiveness of the model. The training phase is driven by three primary components: the model architecture (which defines the structure of the algorithm(s) 620), the training data (which provides the examples from which to learn), and the learning algorithm (which dictates how the model adjusts its model parameters). The goal is for the model to capture the underlying patterns of the data without memorizing specific examples, thus enabling it to perform well on new, unseen data.

The model architecture is the specific arrangement and structure of the various components and layers that make up a model. This includes the configuration of layers in a neural network, such as the number of layers, the type of layers (e.g., convolutional, recurrent, fully connected), the number of neurons in each layer, and the connections between these layers. Model architecture also encompasses the choice and arrangement of features and algorithms used in various models, such as decision trees or linear regression. The architecture determines how input data is processed and transformed through various computational steps to produce the output. The model architecture directly influences the model's ability to learn from the data effectively and efficiently, and it impacts how well the model performs tasks such as classification, regression, or prediction, adapting to the specific complexities and nuances of the data it is designed to handle.

The model architecture can encompass a wide range of algorithms 620, each suitable for different kinds of tasks and data types. Examples of algorithms 620 include, without limitation, IBCF, MF, linear regression, logistic regression, decision tree, Support Vector Machines, Naives Bayes algorithm, K-Nearest Neighbors, K-Means, Random forest, dimensionality reduction algorithms, AdaBoosting algorithm, Gradient Boosting Machines, and Artificial Neural Networks such as convolutional neural network ("CNN"), an inception neural network, a U-Net, a V-Net, a residual neural network ("Resnet"), a transform neural network, a recurrent neural network, or other variants of Deep Neural Networks ("DNN") (e.g., a multi-label n-binary DNN classifier or multi-class DNN classifier). These algorithms can be implemented using various machine learning libraries and frameworks such as TensorFlow, PyTorch, Keras, and scikit-learn, which provide extensive tools and features to facilitate model building, training, validation, and testing.

The learning algorithm is the overall method or procedure used to adjust the model parameters 645 to fit the data. It dictates how the model learns from the data provided during training. This includes the steps or rules that the algorithm follows to process input data and make adjustments to the model's internal parameters (e.g., weights in neural networks) based on the output of the objective function. Examples of learning algorithms include gradient descent, backpropagation for neural networks, and splitting criteria in decision trees.

Various techniques may be employed by training and validation subsystem 615 to train machine learning models 630 using the learning algorithm, depending on the type of model and the specific task. For supervised learning models, where the training data includes both inputs and expected outputs (e.g., ground truth labels), gradient descent is a possible method. This technique iteratively adjusts the model parameters 645 to minimize or maximize an objective function (e.g., a loss function, a cost function, a contrastive loss function, etc.). The objective function is a method to measure how well the model's predictions match the actual labels or outcomes in the training data. It quantifies the error between predicted values and true values and presents this error as a single real number. The goal of training is to minimize this error, indicating that the model's predictions are, on average, close to the true data. Common examples of loss functions include mean squared error for regression tasks and cross-entropy loss for classification tasks.

The adjustment of the model parameters 645 is performed by the optimization function or algorithm, which refers to the specific method used to minimize (or maximize) the objective function. The optimization function is the engine behind the learning algorithm, guiding how the model parameters 645 are adjusted during training. It determines the strategy to use when searching for the best weights that minimize (or maximize) the objective function. Gradient descent is a primary example of an optimization algorithm, including its variants like stochastic gradient descent (SGD), mini-batch gradient descent, and advanced versions like Adam or RMSprop, which provide different ways to adjust learning rates or take advantage of the momentum of changes. For example, in training a neural network, backpropagation may be used with gradient descent to update the weights of the network based on the error rate obtained in the previous epoch (cycle through the full training dataset). Another technique in supervised learning is the use of decision trees, where a tree-like model of decisions is built by splitting the training dataset into subsets based on an attribute value test. This process is repeated on each derived subset in a recursive manner called recursive partitioning.

In unsupervised learning, where training data does not include labels, different techniques are used. Clustering is one method where data is grouped into clusters that maximize the similarities of data within the same cluster and maximize the differences with data in other clusters. The K-Means algorithm, for example, assigns each data point to the nearest cluster by minimizing the sum of distances between data points and their respective cluster centroids. Another technique, Principal Component Analysis (PCA), involves reducing the dimensionality of data by transforming it into a new set of variables, the principal components, which are uncorrelated and ordered so that the first few retain most of the variation present in all of the original variables. These techniques help uncover hidden structures or patterns in the data, which can be essential for feature reduction, anomaly detection, or preparing data for further supervised learning tasks.

Validating is another phase of developing machine learning models 630 where the model is checked for deficiencies in performance and the hyperparameters 640 are optimized based on validation data provided from the training and validation datasets 610. The validation data helps to evaluate the model's performance, such as accuracy, precision, recall, or F1-score, to gauge how well the model is likely to perform in real-world scenarios. Hyperparameter optimization, on the other hand, involves adjusting the settings that govern the model's learning process (e.g., learning rate, number of layers, size of the layers in neural networks) to find the combination that yields the best performance on the validation data. One optimization technique is grid search, where a set of predefined hyperparameter values are systematically evaluated. The model is trained with each combination of these values, and the combination that produces the best performance on the validation set is chosen.

Although thorough, grid search can be computationally expensive and impractical when the hyperparameter space is large. A more efficient alternative optimization technique is random search, which samples hyperparameter combinations from a defined distribution randomly. This approach can in some instances find a good combination of hyperparameter values faster than grid search. Advanced methods like Bayesian optimization, genetic algorithms, and gradient-based optimization may also used to find optimal hyperparameters more effectively. These techniques model the hyperparameter space and use statistical methods to intelligently explore the space, seeking hyperparameters that yield improvements in model performance.

Once a machine learning model has been trained and validated, it undergoes a final evaluation using test data provided from the training and validation datasets 610, which is a separate subset of the data that has not been used during the training or validation phases (see, e.g., the Model Evaluation discussed above with respect to FIG. 2). This step is crucial as it provides an unbiased assessment of the model's performance in simulating real-world operation. The test dataset serves as new, unseen data for the model, mimicking how the model would perform when deployed in actual use. During testing, the model's predictions are compared against the true values in the test dataset using various performance metrics such as accuracy, precision, recall, and mean squared error, depending on the nature of the problem (classification or regression). This process helps to verify the generalizability of the model—its ability to perform well across different data samples and environments—highlighting potential issues like overfitting or underfitting and ensuring that the model is robust and reliable for practical applications. The machine learning models 630 are fully validated and tested once the output predictions have been deemed acceptable by user defined acceptance parameters. Acceptance parameters may be determined using correlation techniques such as Bland-Altman method and the Spearman's rank correlation coefficients and calculating performance metrics such as the error, accuracy, precision, recall, receiver operating characteristic curve (ROC), etc.

(3) Inference Phase for Machine Learning Models

The inference subsystem 625 is comprised of various components for deploying the machine learning models 630 in a production environment. Deploying the machine learning models 630 includes moving the models from a development environment (e.g., the training and validation subsystem 615, where it has been trained, validated, and tested, into a production environment where it can make inferences on real-world data (e.g., input data 650). This step typically starts with the model being saved after training, including its parameters and configuration such as final architecture and hyperparameters. It is then converted, if necessary, into a format that is suitable for deployment, depending on the deployment environment. For instance, a model trained in a scientific computing environment such as Python might be converted into a Java-friendly format for integration into a larger enterprise application. Deployment can be conducted on various platforms, including on-premises servers, cloud environments like AWS, Azure, Google. Applicants Oracle Cloud (OCI), or even edge devices like smartphones or IoT devices, depending on the application's needs and the expected volume of inference requests.

Once deployed, the model is ready to receive input data 650 and return outputs (inferences 655). In some instances, the model resides as a component of a larger system or service 635 (e.g., an application). In some instances, the machine learning model is a recommender model trained to predict the product ratings for sample customers and this larger system is the RR subsystem and the RCU subsystem described below and with respect to FIGS. 2 and 4. This setup may involve an API (Application Programming Interface) that facilitates communication between the model and the application. The application collects input data 650 from users or other systems, processes it to the format expected by the model, and sends it to the model via the API. The model then performs the inference and sends the predictions back to the application. This application-layer integration ensures that the model can receive new data, process it appropriately, and provide outputs 650 in a way that is useful for the end-users or other systems.

The implementation of the training and deployment framework for a machine learning based recommendation system comprising the RR subsystem and the RCU subsystem comprises two sections: (1) RR subsystem deployment (shown in FIG. 6B) and (2) RCU subsystem deployment (shown in FIG. 6C).

Figure 6B:
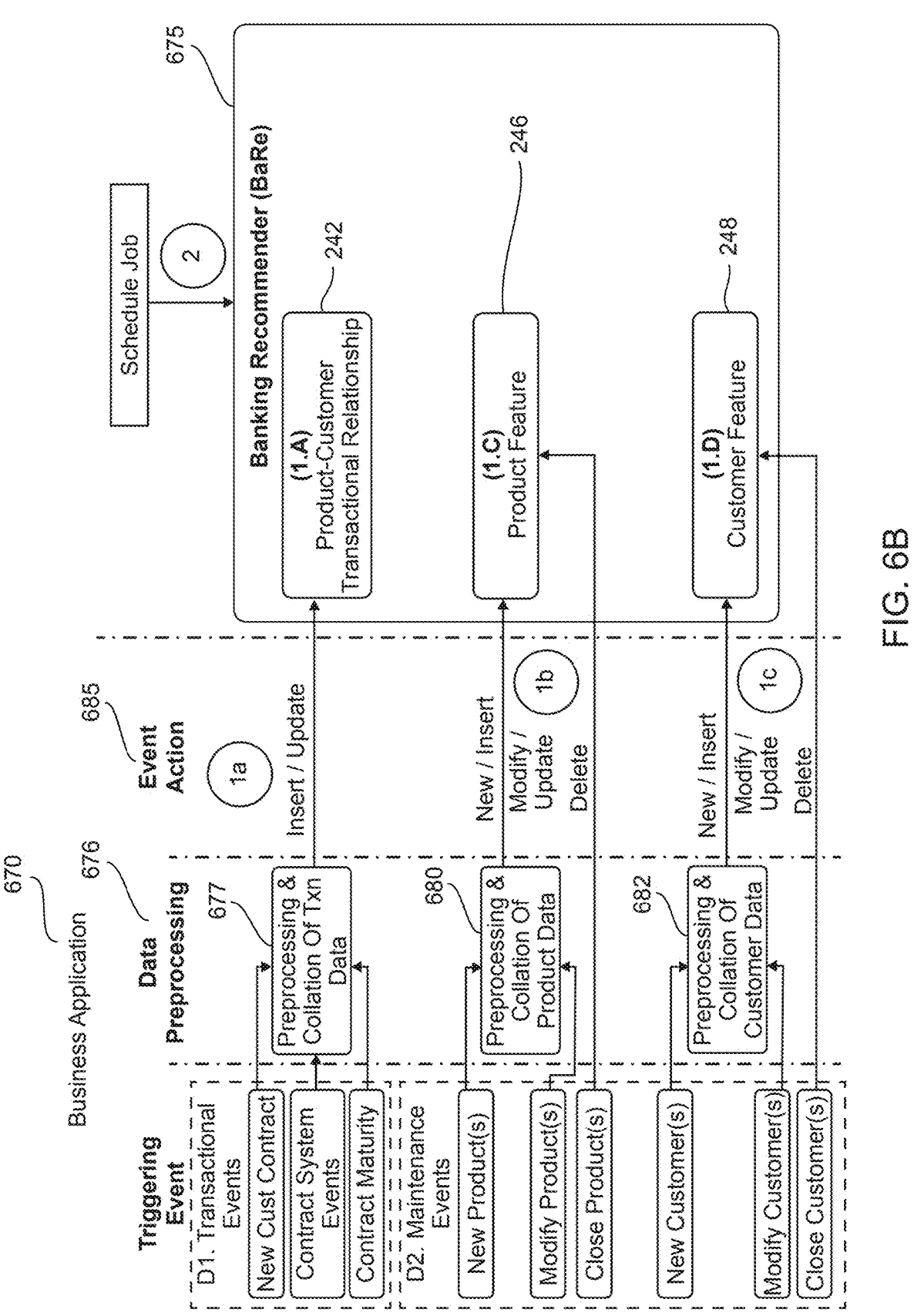
FIG. 6B is a simplified block diagram of a Resource Recommender subsystem deployment according to various embodiments.

As shown in FIG. 6B, the RR subsystem deployment primarily involves an application 670 (e.g., business application such as a banking application deployed as part of a service offered by a infrastructure as a service (IaaS) as described in detail herein) and the RR subsystem 675. On the application 670, D1. Triggering Events and D2. Maintenance Events trigger data preprocessing 676 including the preprocessing and collation of customer transaction data 677, product data 680, and customer data 682. Once preprocessed, event actions 685 may be executed on the customer transaction data 677, the product data 680, and the customer data 682. The event actions 685, including new adds, insertions, updates, and modifications for the data, are executed via paths 1a, 1b & 1c on the various models of the RR subsystem including Product-Customer Transactional Relationship data model 242, Product features data model 246, and Customer features data model 248, respectively. A pre-determined scheduled job can also be executed for the RR subsystem refresh, identified by path 2.

Figure 6C:
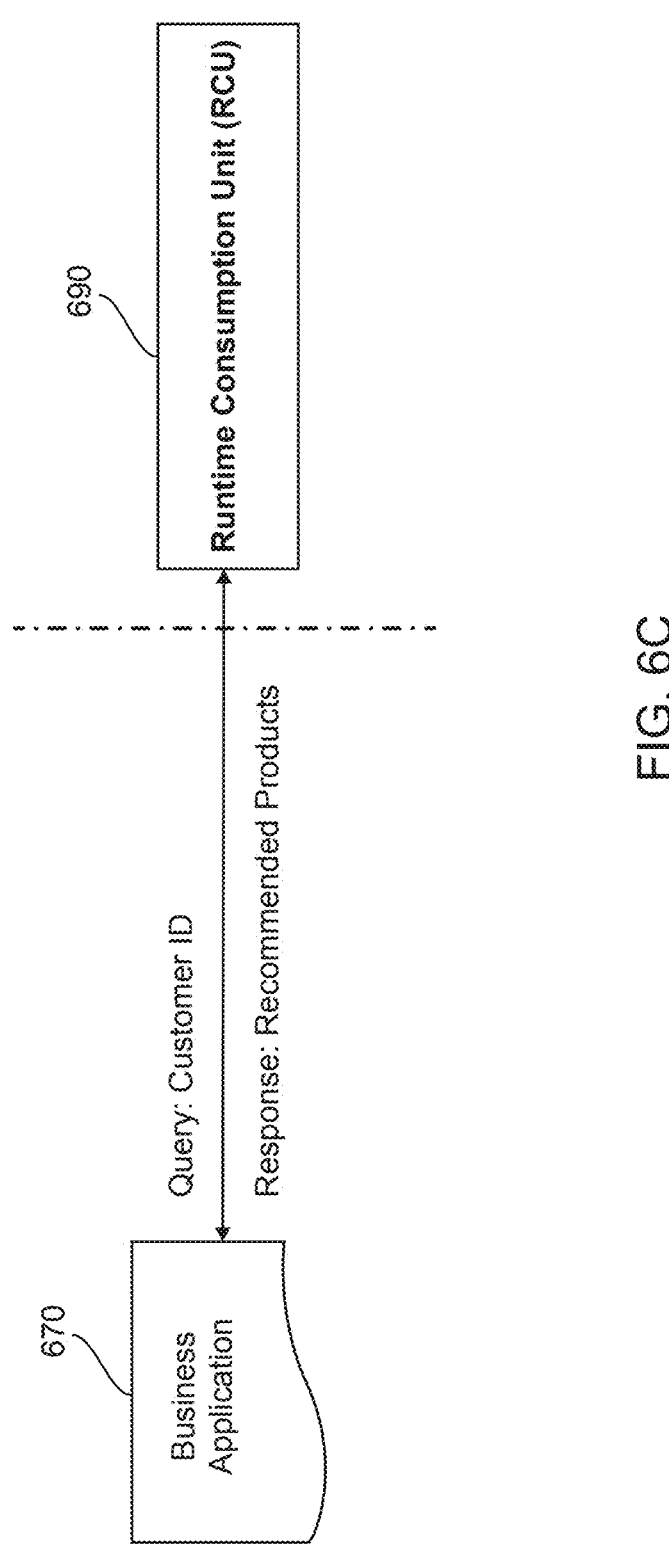
FIG. 6C is a simplified block diagram of a Runtime Consumption Unit subsystem deployment according to various embodiments.

As shown in FIG. 6C, the RCU subsystem deployment primarily involves the application 670 (e.g., business application such as a banking application deployed as part of a service offered by a infrastructure as a service (IaaS) as described in detail herein) and the RCU subsystem 690. On the application 670, a query is executed for a customer ID associated with a customer on the revised persistent database object 290 for the Final Recommendation 235 to acquire a requisite response (e.g., products to be recommended to the customer), as discussed above with respect to FIG. 4. A number of products to be recommended to the customer associated with the customer ID are selected and communicated to the customer. The number of products to be recommended to the customer may be determined by a parametric setting (e.g., top 3).

To manage and maintain its performance, a deployed model may be continuously monitored to ensure it performs as expected over time. This involves tracking the model's prediction accuracy, response times, and other operational metrics. Additionally, the model may require retraining or updates based on new data or changing conditions in the environment it is applied in. This can be useful because machine learning models can drift over time due to changes in the underlying data they are making predictions on—a phenomenon known as model drift. Therefore, maintaining a machine learning model in a production environment often involves setting up mechanisms for performance monitoring, regular evaluations against new test data, and potentially periodic updates and retraining of the model to ensure it remains effective and accurate in making predictions.

V. Techniques for Training And Deployment of A Machine Learning Based Recommendation System FIG. 7 shows an exemplary workflow 700 for training and deployment of a machine learning based recommendation system in accordance with various embodiments. The processing depicted in FIG. 7 may be implemented in software (e.g., code, instructions, program) executed by one or more processing units (e.g., processors, cores) of the respective systems, hardware, or combinations thereof (e.g., the RR subsystem and the RCU subsystem described with respect to FIGS. 2 and 4). The software may be stored on a non-transitory storage medium (e.g., on a memory device). The method presented in FIG. 7 and described below is intended to be illustrative and non-limiting. Although FIG. 7 depicts the various processing operations occurring in a particular sequence or order, this is not intended to be limiting. In certain alternative embodiments, the workflow 700 may be performed in some different order or some operations may be performed at least partially in parallel.

At block 705, product ratings for products are derived using data from a product-user transactional relationship data model and an attribute-weightage data model. The products facilitate allocation and storage of resources, the product-user transactional relationship data model stores identifiers for users in association with both positive and negative attributes from product user relationship interactions with the products, and the product ratings are stored in a user product score table in association with identifiers for users and the products.

In some instances, the workflow 700 further comprises: accessing product features for the products within a product feature data model; clustering the products into cluster types based on the product features to generate a first cluster model; calculating average product ratings for the products in each cluster type or cluster; determining a cluster type or cluster for a new product based on features of the new product and the first cluster model; assigning a product rating to the new product based on the average product rating calculated for the products in the cluster type or cluster; and updating, prior to the sampling, the user product score table to include the new product and assigned product rating.

At block 710, the user product score table is sampled to generate subsets of data comprising examples. The subsets of data include a training data set and testing data set, and each of the examples comprises a product rating in association with an identifier for a user and a product.

At block 715, machine learning models are trained, using the training data set, for a task of predicting product ratings. The training comprises predicting, by each of the machine learning models, product ratings for each user and a product. In some instances, the training the machine learning models further comprises: performing iterative operations to adjust a set of model parameters of each of the machine learning models to minimize a loss or error function of each of the machine learning models, where the loss or error function is configured to calculate the error in the predictions. In some instances, at least one the machine learning models uses an Item-Based Collaborative Filtering algorithm and at least one of the machine learning models uses a Matrix Factorization algorithm.

At block 720, performance of the machine learning models is evaluated using the testing data set. The evaluating comprises comparing the predictions for the product ratings against the derived product ratings for the products in the testing data set to calculate error in the predictions.

At block 725, one of the machine learning models is selected for production use in predicting product ratings based on the evaluating in block 720.

At block 730, new product ratings are predicted, using the selected machine learning model, for the products in the product-user transactional relationship data model.

In some instances, the workflow 700 further comprises: accessing user features for the users within a user feature data model; clustering the users into user types based on the user features to generate a second cluster model; and updating the persistent database object that represents the interim recommendation to include the user types and generate a persistent database object that represents a final recommendation.

In some instances, the workflow 700 further comprises: executing, for a user with an associated user identifier, a query on the persistent database object that represents the final recommendation; retrieving products to be recommended to the user associated with the user identifier based on the query; and communicating to the user at least a subset of the products to be recommended to the user.

In some instances, the workflow 700 further comprises: determining a cluster type or cluster for a new user based on features of the new user and the second cluster model; collating all recommended products of all users falling into the same cluster type or cluster as the new user; ranking all the collated recommend products per frequency; retrieving products to be recommended to the new user based on the ranking; and communicating to the new user at least a subset of the products to be recommended to the new user.

VI. Example Cloud Implementation

As noted above, infrastructure as a service (IaaS) is one particular type of cloud computing that can be used for providing the various techniques described herein. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
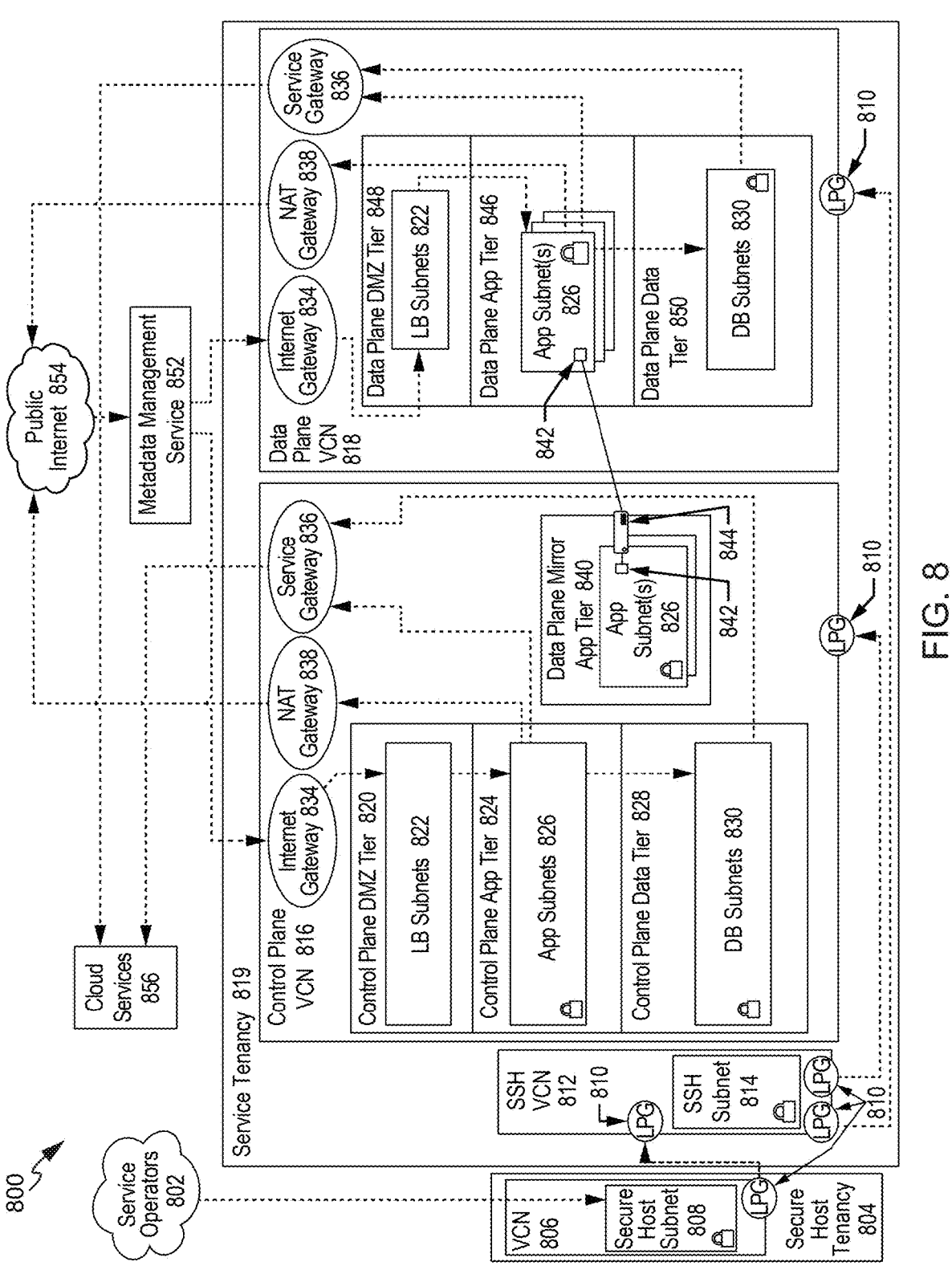
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
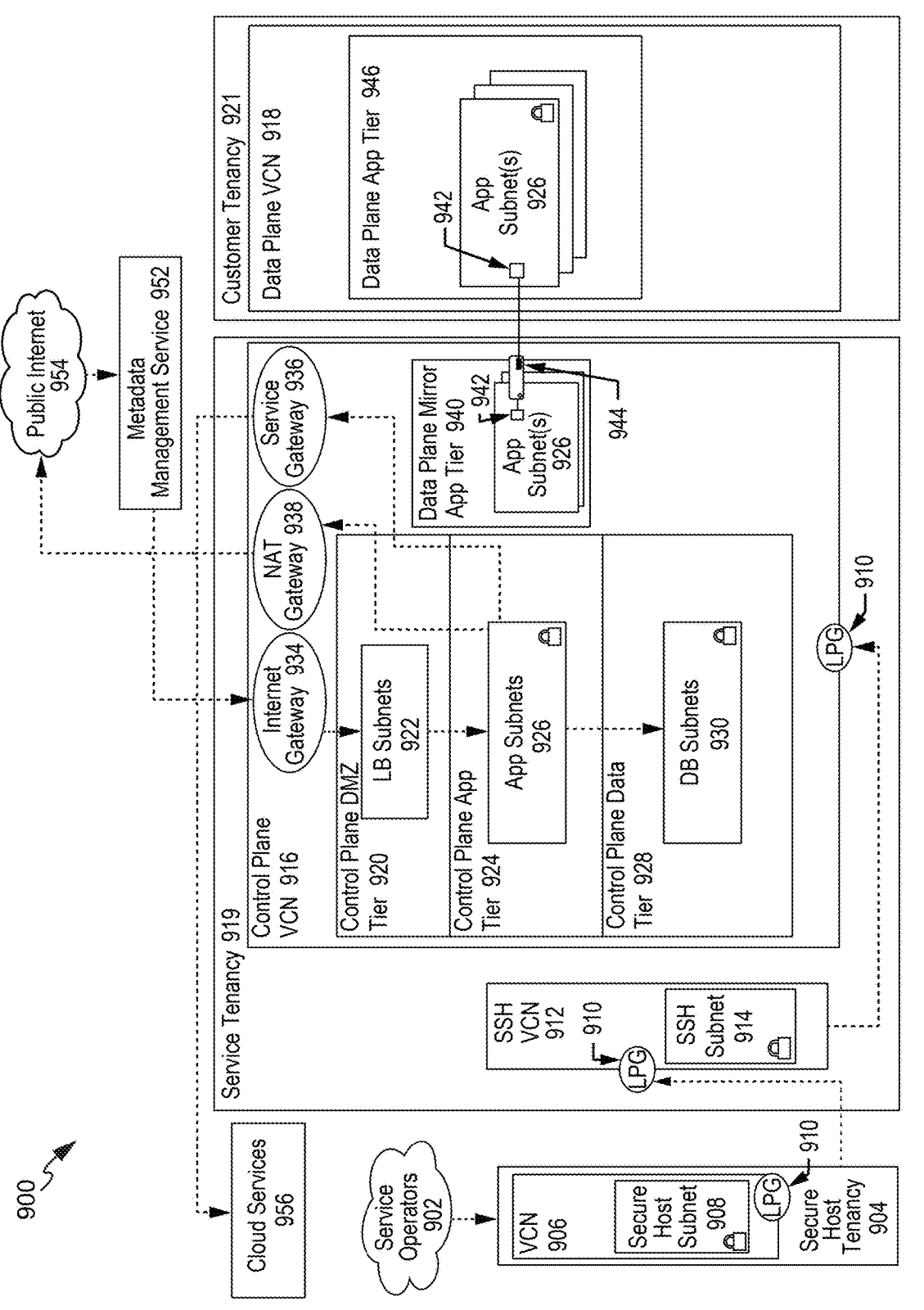
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
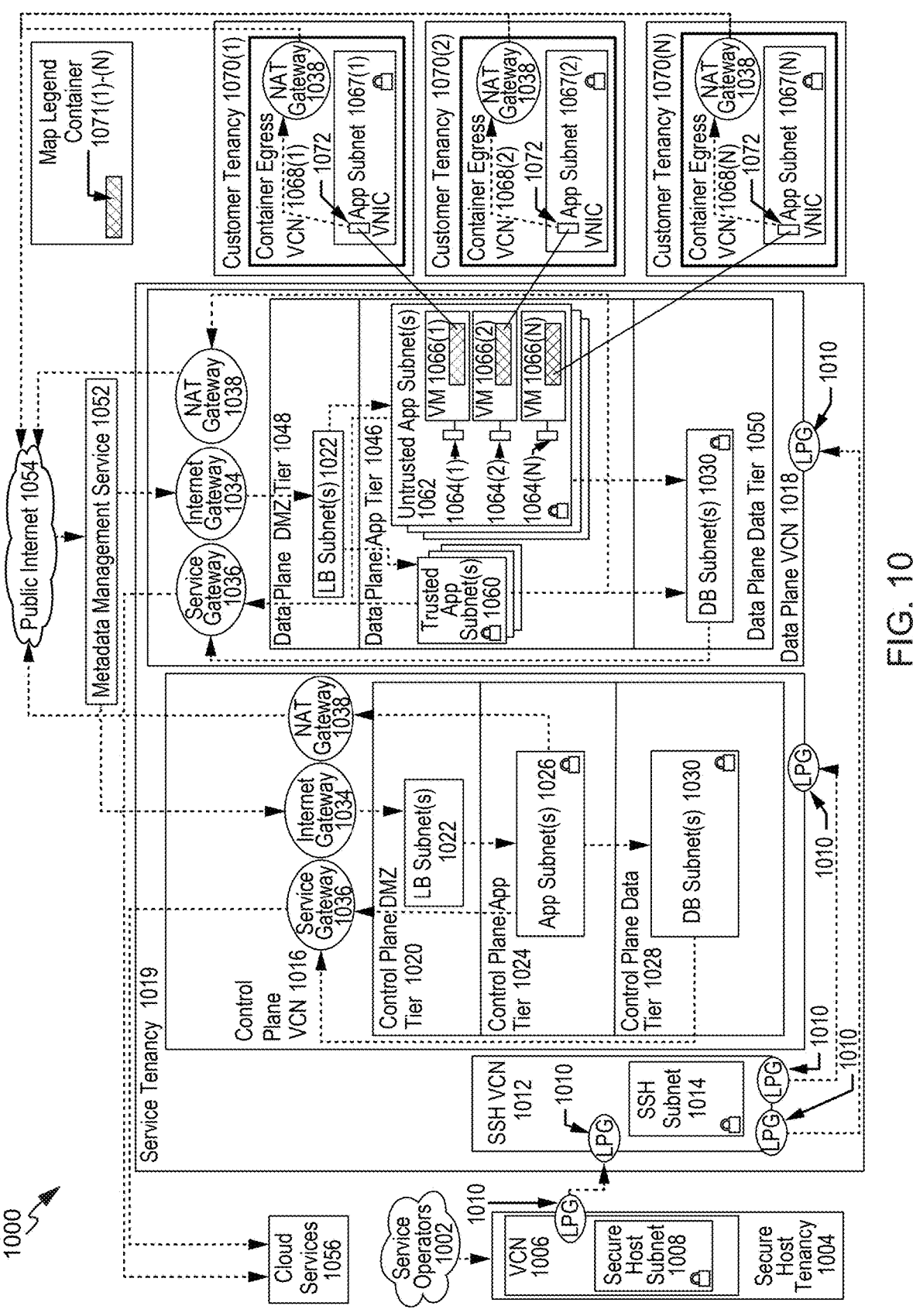
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
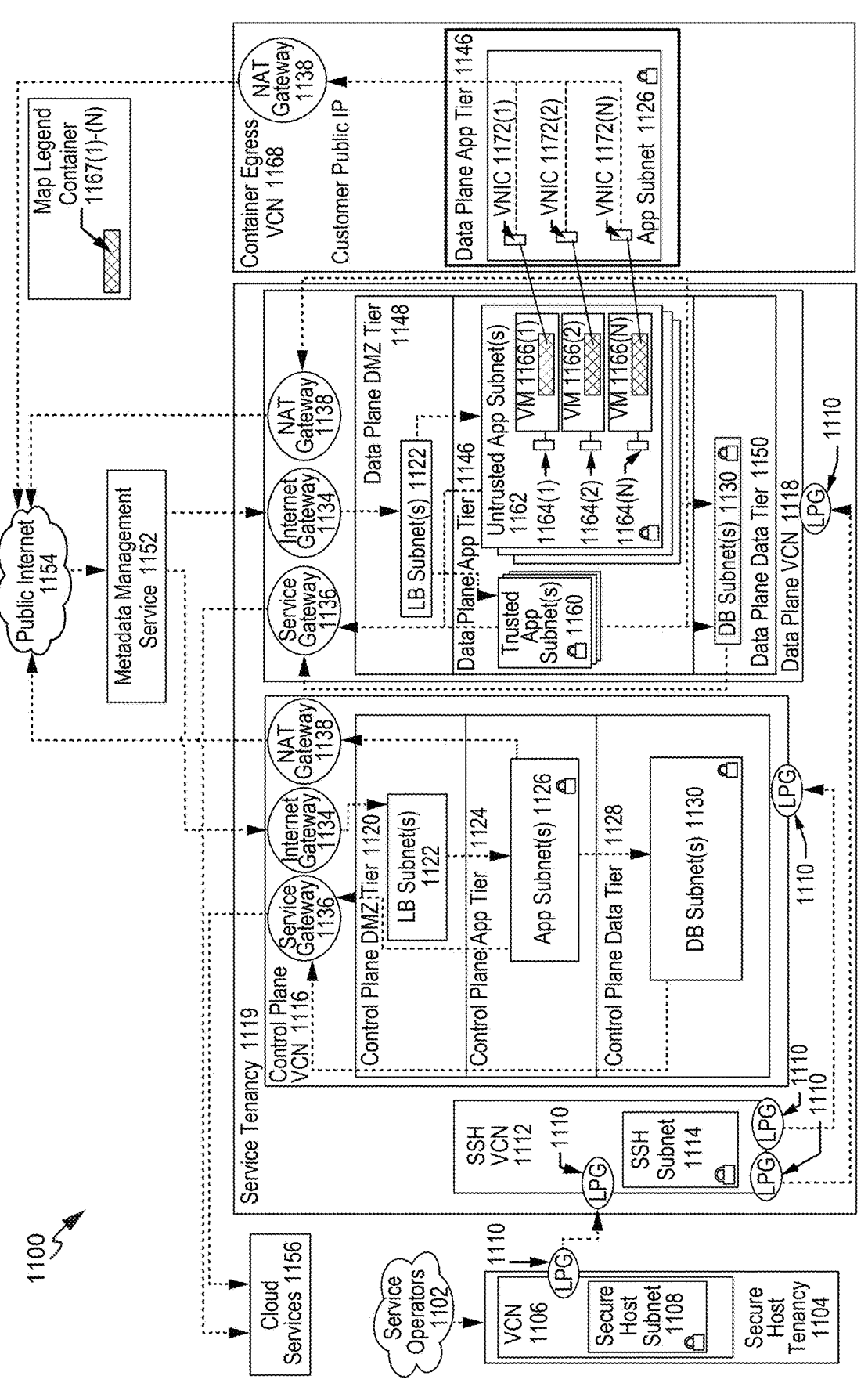
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
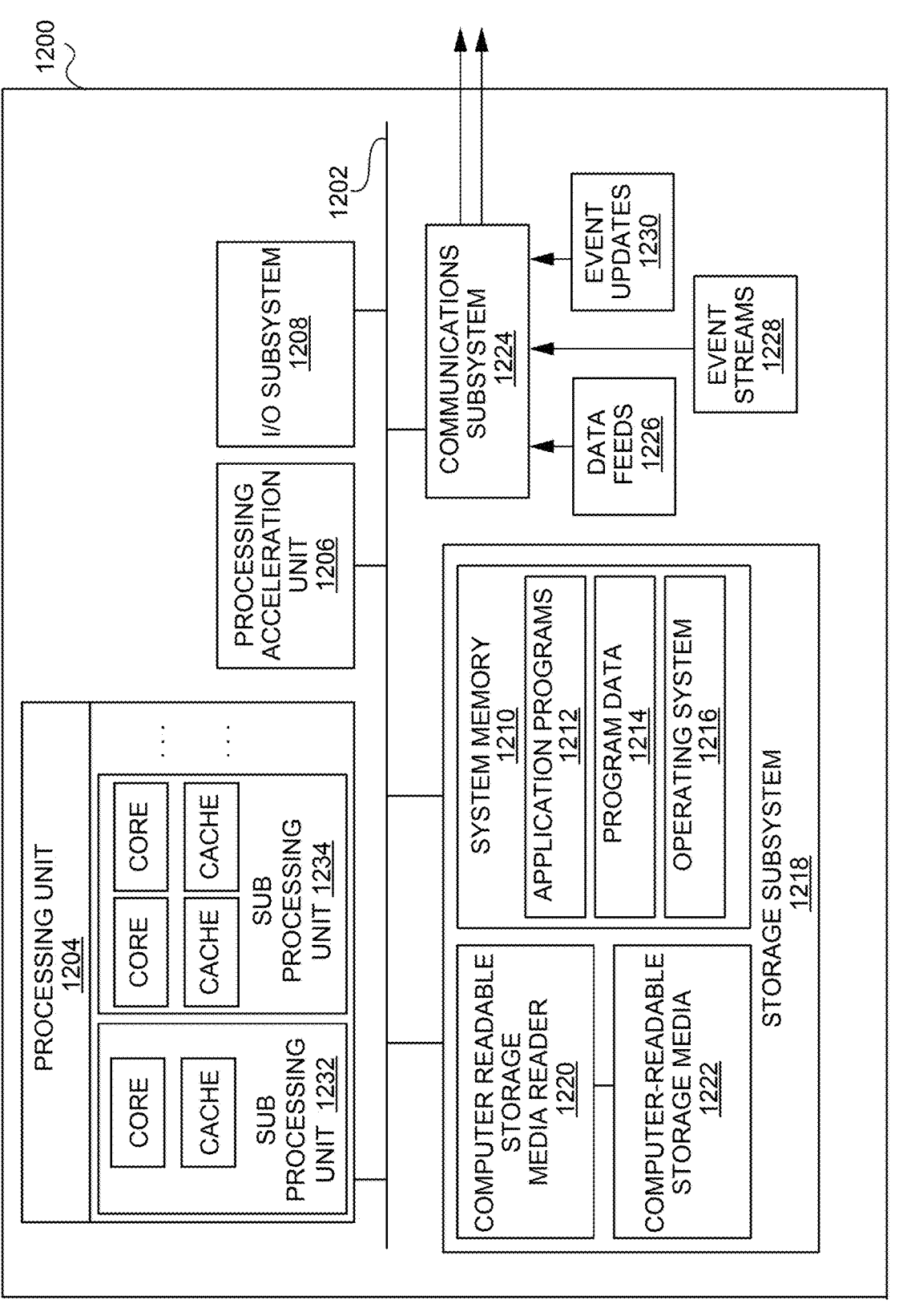
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

deriving product ratings for products using data from a product-user transactional relationship data model and an attribute-weightage data model, wherein:

the products facilitate allocation and storage of resources, the product-user transactional relationship data model stores user identifiers for users in association with both positive and negative attributes from product user relationship interactions with the products, and the product ratings are stored in a user product score table in association with the user identifiers and the products;

clustering the products into clusters based on product features to generate a first cluster model, wherein each cluster represents a group of products by a product type;

calculating average product ratings for the products in each cluster;

determining a predicted cluster for a new product based on features of the new product and the first cluster model;

assigning a product rating to the new product based on the average product rating calculated for the products in the cluster that is the same as the predicted cluster;

updating the user product score table to include the new product and assigned product rating;

sampling the updated user product score table to generate subsets of data comprising examples, wherein the subsets of data include a training data set and a testing data set, and each of the examples comprises a product rating in association with ana user identifier for a user and a product;

training, using the training data set, machine learning models for a task of predicting product ratings, by iteratively training the machine learning models to adjust a set of values for model parameters of each of the machine learning models to minimize a loss or error function of each of the machine learning models and to obtain an optimized set of values for model parameters, wherein the trained machine learning models, are configured to, based on an input product and an input user identifier, output product ratings for each user and a product;

generating the trained machine learning models with the optimized set of values for model parameters;

evaluating, using the testing data set, performance of the trained machine learning models, wherein the evaluating comprises comparing the predictions for the product ratings against the derived product ratings for the products in the testing data set to calculate error in the predictions;

selecting one of the trained machine learning models for production use in predicting product ratings based on the evaluating;

predicting, using the selected trained machine learning model, new product ratings for the products in the product-user transactional relationship data model;

storing the new product ratings in association with the user identifiers and recommended products within a persistent database object that represents an interim recommendation;

clustering the users into clusters based on user features to generate a second cluster model, wherein each cluster represents a group of users by a user type;

updating the persistent database object representing the interim recommendation to include, per the user identifier, a cluster identifier corresponding to the user type and generate the updated persistent database object that represents a final recommendation;

receiving a user-initiated query from a user device of a particular user;

determining whether the particular user is associated with any user identifier or a new user; and performing the following:

if the particular user is associated with the user identifier, retrieving using the user identifier, from the updated persistent database object representing the final recommendation, products to be recommended to the particular user based on the user-initiated query;

if the particular user is the new user, (i) determining a user type for the new user based on features of the new user and the second cluster model, to predict a predicted cluster identifier for the new user, (ii) collating the recommended products of all users whose user identifiers are associated with the cluster identifier that is the same as the predicted cluster identifier for the new user, and (iii) determining products to be recommended to the new user from the collated recommended products; and transmitting to the user device of the particular user, as an output to the user-initiated query, at least a subset of the products to be recommended to the user.

2. The computer-implemented method of claim 1, further comprising:

prior to the clustering the products, accessing the product features for the products within a product feature data model;

and updating, prior to the sampling, the user product score table to include the new product and assigned product rating.

3. The computer-implemented method of claim 1, further comprising:

prior to clustering the users, accessing user features for the users within a user feature data model.

4. The computer-implemented method of claim 1, further comprising:

ranking all the collated recommended products per frequency; and retrieving products to be recommended to the new user based on the ranking.

5. The computer-implemented method of claim 1, wherein the loss or error function is configured to calculate the error in the predictions.

6. The computer-implemented method of claim 1, wherein at least one of the machine learning models uses an Item-Based Collaborative Filtering (IBCF) algorithm and at least one of the machine learning models uses a Matrix Factorization (MF) algorithm.

7. A system comprising:

one or more processors; and one or more computer-readable media storing instructions which, when executed by the one or more processors, cause the system to perform operations including:

deriving product ratings for products using data from a product-user transactional relationship data model and an attribute-weightage data model, wherein:

the products facilitate allocation and storage of resources, the product-user transactional relationship data model stores user identifiers for users in association with both positive and negative attributes from product user relationship interactions with the products, and the product ratings are stored in a user product score table in association with the user identifiers and the products;

clustering the products into clusters based on product features to generate a first cluster model, wherein each cluster represents a group of products by a product type;

calculating average product ratings for the products in each cluster;

determining a predicted cluster for a new product based on features of the new product and the first cluster model;

assigning a product rating to the new product based on the average product rating calculated for the products in the cluster that is the same as the predicted cluster;

updating the user product score table to include the new product and assigned product rating;

sampling the updated user product score table to generate subsets of data comprising examples, wherein the subsets of data include a training data set and a testing data set, and each of the examples comprises a product rating in association with a user identifier for a user and a product;

training, using the training data set, machine learning models for a task of predicting product ratings, by iteratively training the machine learning models to adjust a set of values for model parameters of each of the machine learning models to minimize a loss or error function of each of the machine learning models and to obtain an optimized set of values for model parameters, wherein the trained machine learning models are configured to, based on an input product and an input user identifier, output product ratings for each user and a product;

generating the trained machine learning models with the optimized set of values for model parameters;

evaluating, using the testing data set, performance of the trained machine learning models, wherein the evaluating includes comparing the predictions for the product ratings against the derived product ratings for the products in the testing data set to calculate error in the predictions;

selecting one of the trained machine learning models for production use in predicting product ratings based on the evaluating;

predicting, using the selected trained machine learning model, new product ratings for the products in the product-user transactional relationship data model;

storing the new product ratings in association with the user identifiers and recommended products within a persistent database object that represents an interim recommendation;

clustering the users into clusters based on user features to generate a second cluster model, wherein each cluster represents a group of users by a user type;

updating the persistent database object representing the interim recommendation to include, per the user identifier, a cluster identifier corresponding to the user type and generate the updated persistent database object that represents a final recommendation;

receiving a user-initiated query from a user device of a particular user;

determining whether the particular user is associated with any user identifier or a new user; and performing the following:

if the particular user is associated with the user identifier, retrieving using the user identifier, from the updated persistent database object representing the final recommendation, products to be recommended to the particular user based on the user-initiated query;

if the particular user is the new user, (i) determining a user type for the new user based on features of the new user and the second cluster model, to predict a predicted cluster identifier for the new user, (ii) collating the recommended products of all users whose user identifiers are associated with the cluster identifier that is the same as the predicted cluster identifier for the new user, and (iii) determining products to be recommended to the new user from the collated recommended products; and transmitting to the user device of the particular user, as an output to the user-initiated query, at least a subset of the products to be recommended to the user.

8. The system of claim 7, wherein the operations further include:

prior to the clustering the products, accessing the product features for the products within a product feature data model;

and updating, prior to the sampling, the user product score table to include the new product and assigned product rating.

9. The system of claim 8, wherein the operations further include:

prior to clustering the users, accessing user features for the users within a user feature data model.

10. The system of claim 9, wherein the operations further include:

ranking all the collated recommended products per frequency; and retrieving products to be recommended to the new user based on the ranking.

11. The system of claim 7, wherein the loss or error function is configured to calculate the error in the predictions.

12. The system of claim 7, wherein at least one of the machine learning models uses an Item-Based Collaborative Filtering (IBCF) algorithm and at least one of the machine learning models uses a Matrix Factorization (MF) algorithm.

13. One or more non-transitory computer-readable media storing instructions which, when executed by one or more processors, cause the one or more processors to perform operations including:

deriving product ratings for products using data from a product-user transactional relationship data model and an attribute-weightage data model, wherein:

the products facilitate allocation and storage of resources, the product-user transactional relationship data model stores user identifiers for users in association with both positive and negative attributes from product user relationship interactions with the products, and the product ratings are stored in a user product score table in association with the user identifiers and the products;

clustering the products into clusters based on product features to generate a first cluster model, wherein each cluster represents a group of products by a product type;

calculating average product ratings for the products in each cluster;

determining a predicted cluster for a new product based on features of the new product and the first cluster model;

assigning a product rating to the new product based on the average product rating calculated for the products in the cluster that is the same as the predicted cluster;

updating the user product score table to include the new product and assigned product rating;

sampling the updated user product score table to generate subsets of data comprising examples, wherein the subsets of data include a training data set and a testing data set, and each of the examples comprises a product rating in association with ana user identifier for a user and a product;

training, using the training data set, machine learning models for a task of predicting product ratings, by iteratively training the machine learning models to adjust a set of values for model parameters of each of the machine learning models to minimize a loss or error function of each of the machine learning models and to obtain an optimized set of values for model parameters, wherein the trained machine learning models, are configured to, based on an input product and an input user identifier, output product ratings for each user and a product;

generating the trained machine learning models with the optimized set of values for model parameters;

evaluating, using the testing data set, performance of the trained machine learning models, wherein the evaluating includes comparing the predictions for the product ratings against the derived product ratings for the products in the testing data set to calculate error in the predictions;

selecting one of the trained machine learning models for production use in predicting product ratings based on the evaluating;

predicting, using the selected trained machine learning model, new product ratings for the products in the product-user transactional relationship data model;

storing the new product ratings in association with the user identifiers and recommended products within a persistent database object that represents an interim recommendation;

clustering the users into clusters based on user features to generate a second cluster model, wherein each cluster represents a group of users by a user type;

updating the persistent database object representing the interim recommendation to include, per the user identifier, a cluster identifier corresponding to the user type and generate the updated persistent database object that represents a final recommendation;

receiving a user-initiated query from a user device of a particular user;

determining whether the particular user is associated with any user identifier or a new user; and performing the following:

if the particular user is associated with the user identifier, retrieving using the user identifier, from the updated persistent database object representing the final recommendation, products to be recommended to the particular user based on the user-initiated query;

if the particular user is the new user, (i) determining a user type for the new user based on features of the new user and the second cluster model, to predict a predicted cluster identifier for the new user, (ii) collating the recommended products of all users whose user identifiers are associated with the cluster identifier that is the same as the predicted cluster identifier for the new user, and (iii) determining products to be recommended to the new user from the collated recommended products; and transmitting to the user device of the particular user, as an output to the user-initiated query, at least a subset of the products to be recommended to the user.

14. The one or more non-transitory computer-readable media of claim 13, wherein the operations further include:

prior to the clustering the products, accessing the product features for the products within a product feature data model;

and updating, prior to the sampling, the user product score table to include the new product and assigned product rating.

15. The one or more non-transitory computer-readable media of claim 14, wherein the operations further include:

prior to clustering the users, accessing user features for the users within a user feature data model.

16. The one or more non-transitory computer-readable media of claim 15, wherein the operations further include:

ranking all the collated recommended products per frequency; and retrieving products to be recommended to the new user based on the ranking.

17. The one or more non-transitory computer-readable media of claim 13, wherein the loss or error function is configured to calculate the error in the predictions, and wherein at least one of the machine learning models uses an Item-Based Collaborative Filtering (IBCF) algorithm and at least one of the machine learning models uses a Matrix Factorization (MF) algorithm.

* * * * *